United States Patent [19]
Hagan

[11] Patent Number: 5,631,828
[45] Date of Patent: *May 20, 1997

[54] METHOD AND SYSTEM FOR PROCESSING FEDERALLY INSURED ANNUITY AND LIFE INSURANCE INVESTMENTS

[76] Inventor: Bernard P. Hagan, 220 Montgomery St. #966, San Francisco, Calif. 94104

[*] Notice: The term of this patent shall not extend beyond the expiration date of Pat. No. 5,291,398.

[21] Appl. No.: 265,198

[22] Filed: Jun. 24, 1994

Related U.S. Application Data

[63] Continuation-in-part of Ser. No. 203,348, Feb. 28, 1994, abandoned, which is a continuation of Ser. No. 911,401, Jul. 10, 1992, Pat. No. 5,291,398.

[51] Int. Cl.$^6$ .................................................... G06F 17/60
[52] U.S. Cl. ............................................ 395/204; 395/242
[58] Field of Search .................................... 364/401, 408

[56] References Cited

U.S. PATENT DOCUMENTS

| | | | |
|---|---|---|---|
| 4,985,833 | 1/1991 | Oncken | 364/408 |
| 5,291,398 | 3/1994 | Hagan | 364/408 |

OTHER PUBLICATIONS

Marshall Loeb's 1989 Money Guide, by Marshall Loeb, pp. 239–243: 489–493.

*Primary Examiner*—Gail O. Hayes
*Assistant Examiner*—Gita D. Shingala
*Attorney, Agent, or Firm*—Robert C. Kain, Jr.

[57] ABSTRACT

The method and computer-based system for electronically processing transactional data and monitoring annuity or life insurance funds includes identifying and storing fund data, customer data, beneficiary data, and banking institution data. In one embodiment, banking institutions which hold non-annuity or non-life insurance funds for a particular beneficiary over a pre-determined initial amount are monitored. The system sums all funds, whether qualified or unqualified or annuity or life insurance funds, identified with a single beneficiary and held by the banking institutions. If the sum exceeds the predetermined fund limit, the system either commands the transfer of all additional or excess funds identified with that single beneficiary to another banking institution or transfers the excess funds into an account established for another annuity beneficiary which is a pre-approved beneficiary from a group initially identified by the customer. In a further embodiment, the system generates various reports showing banking institutions for each beneficiary, banking institutions for each beneficiary in the subset of approved beneficiaries, and the sum of all funds for each respective beneficiary. There are generally three methods employed by one or more aspects of the present system which ensure that the beneficiary's invested funds are protected with depositor's insurance. The system may continually monitor the qualified, unqualified and non-annuity or life insurance funds (e.g. daily or at least every two weeks), may periodically monitor these funds (e.g. quarterly) or may not directly and electronically monitor the funds (i.e. shift the reporting requirement and monitoring function to the customer or beneficiary).

48 Claims, 9 Drawing Sheets

METHOD AND SYSTEM FOR PROCESSING FEDERALLY INSURED ANNUITY AND LIFE INSURANCE INVESTMENTS

This is a continuation-in-part of U.S. patent application Ser. No. 08/203,348, filed on Feb. 28, 1994, now abandoned, which is a continuation of U.S. patent application Ser. No. 07/911,401 filed Jul. 10, 1992, now U.S. Pat. No. 5,291,398 issued on Mar. 1, 1994.

BACKGROUND OF THE INVENTION

The present invention relates to a method and a system for electronically processing transactional data and monitoring funds invested in a plurality of annuities or life insurance investments such that the invested funds are protected by depositor's insurance, such as FDIC insurance.

Federally approved banking institutions, and saving and loan institutions, pay premiums to the federal government such that money on deposit in those banking institutions is federally insured. If the banking institution becomes insolvent for any reason, the federal government pays the depositor for any losses up to an established insured limit. At present, deposits are insured up to $100,000.00. There is a regulation which provides that funds deposited by life insurance companies or a corporation solely to fund life insurance or annuity contracts will be insured up to the depositor's insurance limit ($100,000.00) per individual (annuitant) entitled to receive benefits under the contract. The persons entitled to receive benefits under an annuity contract are called herein "annuity beneficiaries" whether those persons are legally classified as annuitants or as beneficiaries. An annuity contract is a contract that pays an annuity beneficiary an amount at regular intervals or pays an annuity beneficiary a lump sum at a predetermined time in the future. The annuity may be a variable annuity which pays a beneficiary variable returns from various investments, over a period of time or at a certain time, based upon certain financial conditions, i.e. S & P 500 index, or may be fixed annuity which pays the beneficiaries a fixed or set sum of money over a period of time. The annuity contract is funded or provided for by a customer. Essentially, the customer pays a certain amount of money to a company, the company invests that money, and the company at a certain time in the future or at regular intervals pays the annuity beneficiary a prescribed amount as required under the annuity contract. Annuity beneficiaries are sometimes called "annuitants."

Some types of annuity contracts are deferred annuity contracts. Deferred annuity contracts allow funds to be accumulated on a tax deferred basis over the term of the contract and pay a lump sum or make periodic payments to annuitants at a certain time in the future. For example, a customer may fund a deferred annuity and, upon retirement of the customer, the company holding the annuity pays the customer either a lump sum or periodic payments as selected by the annuitant. In this example, the contract is annuitized upon retirement of the customer. If the contract is surrendered during early years, there are surrender penalties. If there are partial withdrawals, penalties sometimes apply. Interest if withdrawn is reportable as income in the year of withdrawal.

In order to obtain the benefit of the depositor's insurance, the corporation holding the annuity must establish an internal account for the annuity beneficiary and place the funds on deposit with a federally approved institution (FDIC institution). However, the corporation can accumulate and combine investments for a number of annuity beneficiaries and invest that aggregate sum with a single banking institution. The regulations provide that, in the event the banking institution becomes insolvent, the federal agency providing the depositors' insurance will pay the depositors up to the established depositor's insurance limit value.

Tax deferred annuities are presently being marketed throughout the United States by life insurance companies. Tax law presently allows interest earnings in tax deferred annuity accounts to accumulate tax free until withdrawn. Consequently, this form of annuity has become a popular investment, particularly for those saving for their retirement years. However, funds invested in deferred annuities are not federally insured. There have been losses suffered by purchasers of annuities due to the inability of some insurance companies to remain solvent. This is particularly devastating for anyone depending on annuity income for support during retirement years. It would be a great benefit if the features of tax deferred annuities could be combined with federal deposit insurance.

Funds deposited in Federal Deposit Insurance Corporation (FDIC) banks solely to fund annuities or life insurance contracts are currently insured up to $100,000.00 for each annuitant. Present FDIC regulations permit this to be done. A system that enables life insurance and annuity companies to place annuity funds or life insurance funds so as to be covered by federal deposit insurance without exceeding those limitations and which continually monitors accounts for the same purpose, performs a valuable service for the customer.

Individuals that presently have funds in banks can maintain their deposits in different categories of legal ownership which makes it possible to have more than $100,000.00 insurance coverage in a single institution. This is true only if the funds are owned and deposited in different ownership categories. Individuals almost always monitor their deposits in savings institutions so as to maintain full insurance coverage at all times. However, if such individuals purchase a tax deferred annuity that is to be deposited in an insured institution, the responsibility to monitor such funds as to their insurability shifts to the insurance or annuity company. A problem immediately arises since a multi-state life insurance company collecting premiums from thousands of contract holders throughout the U.S. could inadvertently fund an annuitant's contract by depositing funds in an institution in which the annuitant already has a standard deposit, savings account or certificate of deposit. If the funds deposited by the insurance company and the already existing account in that same institution are maintained in the same category of legal ownership, FDIC regulations require that the insured limit must be applied to the combined total amount held within each category. This could result in funds being without insurance coverage. This would be a violation of the contract on the part of the insurance or annuity company that promised to place the funds so as to be federally insured. Given that a multiplicity of insurance companies would be depositing funds in a multiplicity of banks involving annuity accounts from thousands of customers, a system needs to be devised that would safeguard annuity purchasers from the risk of uninsured accounts, and which would enable insurance companies to meet their contractual obligations. Such a system must also periodically monitor accounts focusing on the impact of interest additions to all accounts and the impact thereof as it relates to insurance limits.

Life insurance companies also sell various types of life insurance financial products. For example, whole life, term life and universal life insurance financial products are sold by these companies. As stated earlier, funds deposited by life insurance companies solely to fund life insurance contracts will be insured up to the depositor's insurance limit per beneficiary entitled to receive benefits under the contract.

OBJECTS OF THE INVENTION

It is an object of the present invention to provide a method and a computer-based system for processing transactional data and monitoring funds of a plurality of annuities whereby the funds are fully protected by depositor's insurance.

It is another object of the present invention to provide a method and a computer-based system which monitors the value of each annuity beneficiary's fund placed in each banking institution such that the total amount of funds, both principal and interest, plus any non-annuity funds and unqualified annuity funds, in each banking institution is less than a predetermined fund limit (which may be equal to or less than the depositor' insurance limit).

It is another object of the present invention to provide a method and a computer-based system which classifies, in certain instances, banking institutions as being non-available institutions when the annuity fund in a respective institution for a particular annuity beneficiary exceeds the predetermined fund limit.

It is a further object of the present invention to provide a method and a computer-based system which transfers funds in excess of the insured limit to another available banking institution or transfers the excess to another account established for a pre-approved annuity beneficiary associated with or related to the primary annuity beneficiary.

SUMMARY OF THE INVENTION

The method and computer-based system for electronically processing transactional data and monitoring annuity funds includes identifying and storing annuity fund data, customer data, annuity beneficiary data, and banking institution data. In one embodiment, banking institutions which hold non-annuity funds for a particular annuity beneficiary over a pre-determined initial amount are classified as non-available banking institutions for that beneficiary. In another embodiment, the institutions are not labeled but all non-annuity funds are monitored at the bank. The system sums all funds, whether qualified or unqualified or non-annuity funds, identified with a single annuity beneficiary and held by the banking institutions. In one embodiment, if the sum exceeds the predetermined fund limit, that identified banking institution is classified as a non-available banking institution for that particular annuity beneficiary. For both embodiments, the system either commands the transfer of all additional or excess annuity funds identified with that single annuity beneficiary to another banking institution or transfers the excess funds into an account established for another annuity beneficiary which is a pre-approved beneficiary from a group initially identified by the customer.

In a further embodiment, the system generates various reports showing banking institutions for each annuity beneficiary, banking institutions for each annuity beneficiary in the subset of approved beneficiaries, and the sum of all annuity funds for each respective annuity beneficiary. One version of the method and computer-based system stores and processes information regarding purchased certificates of deposit (CDs) and the due dates of those CDs such that when a particular CD becomes due and the principal is returned to the investment annuity company, the system declassifies the issuing banking institution from non-available to available for a particular annuity beneficiary or group of beneficiaries.

There are generally three methods employed by one or more aspects of the present system which ensure that the beneficiary's invested funds are protected with depositor's insurance. The system may continually monitor the qualified, unqualified and non-annuity funds (e.g. daily or at least every two weeks), may periodically monitor these funds (e.g. quarterly) or may not directly and electronically monitor the funds (i.e. shift the reporting requirement and monitoring function to the customer or beneficiary). The monitoring may encompass a single bank or multiple banks. To ensure that the sum of the funds do not exceed the insured limit, the sum can be compared to a lower pre-determined fund limit such that unqualified and non-annuity funds below a predetermined depositor's threshold do not affect the insurability of the qualified annuity funds in the institution. Otherwise the actual value of the unqualified and non-annuity funds is ascertained by the computer-based system and the system uses that data to ensure that the total value of the investments in the bank do not exceed the depositor's insurance.

Diversification of the annuity investments and conversion of realized gains and earnings into the insured annuity fund are also covered and processed by the present system.

BRIEF DESCRIPTION OF DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to a method and a system for electronically processing transactional data and monitoring funds invested in a plurality of annuities in order to obtain the benefit of depositor's insurance available through a plurality of federally approved banking institutions.

Figure 1A:
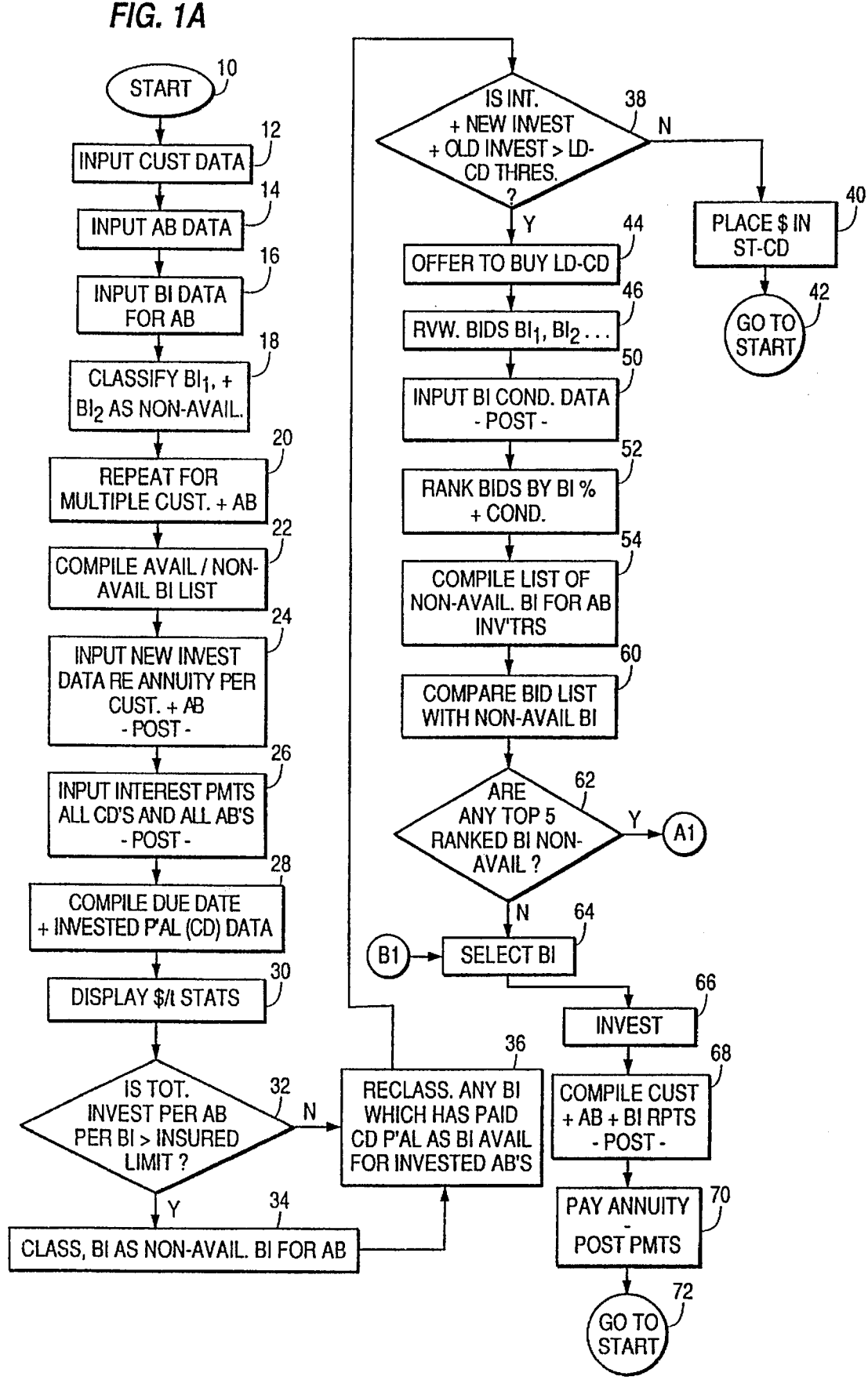
FIGS. 1A and 1B diagrammatically illustrate the method and system for processing transactional data for annuities.
Figure 1B:
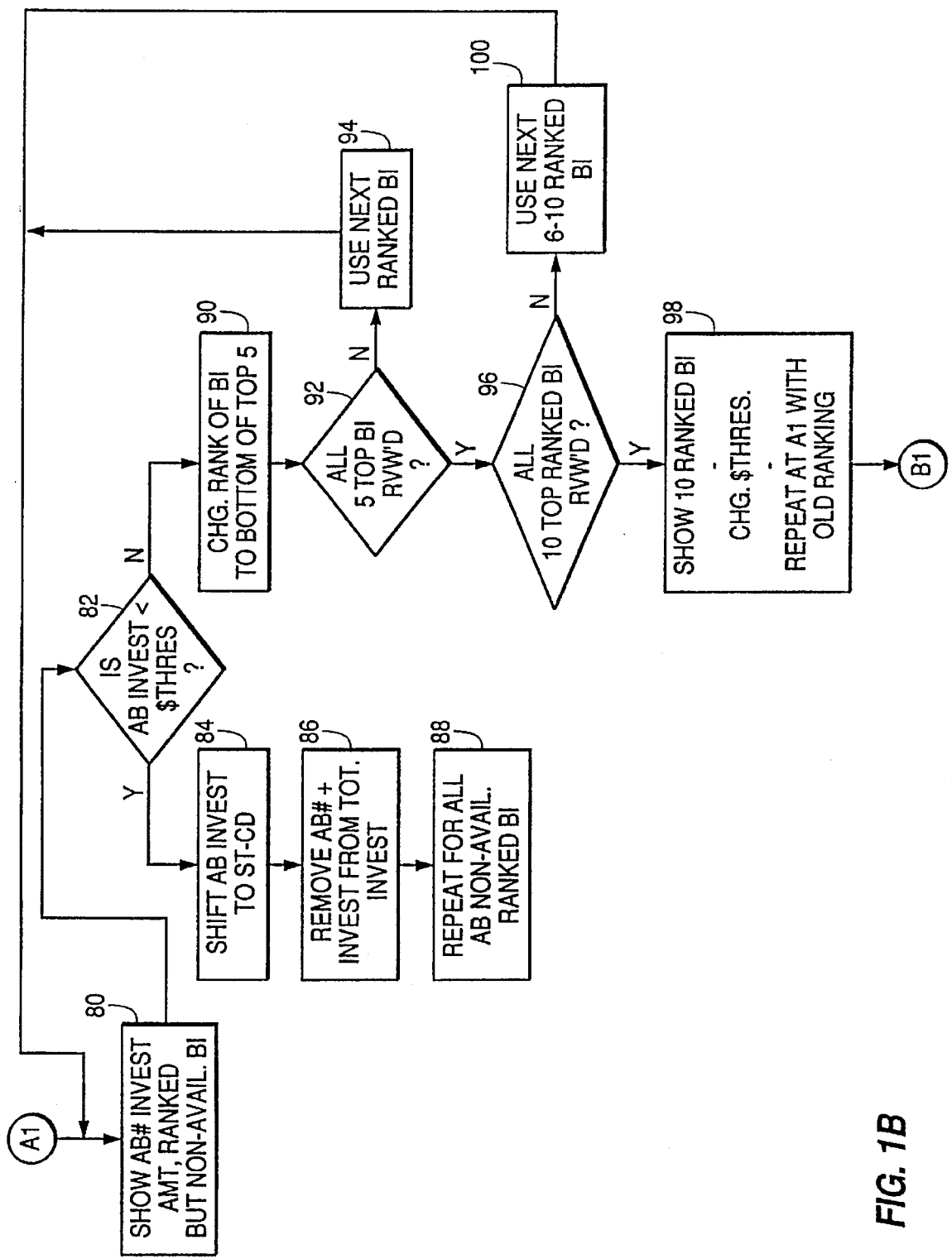

FIGS. 1A and 1B show the method and processing system, in diagrammatic flow chart form, which accomplish the objects and advantages set forth above.

The program starts in FIG. 1A at start step 10. In step 12, customer data is input into the system. This customer data may be kept as a customer record that includes the customer's name, address, customer identification number, social security number, and identifiers for each annuity contract funded or provided by the customer. The term "annuity beneficiary" as used herein covers any category of ownership in which an annuity contract can be held including individual accounts, joint accounts, various trust accounts, and any other legal form of ownership. For example, customer 1 may have annuity #1 which designates a single individual who will receive money when the contract is annuitized. That individual is classified herein as annuity beneficiary $AB_1$. $AB_1$ may be the customer himself or herself. The customer may also have a second annuity contract, annuity #2, which is held in joint names, e.g., husband and wife. This joint ownership is classified herein as a single annuity beneficiary $AB_{10}$. The system described herein incorporates this concept.

To further explain this aspect of the invention, the governmental regulations view each of the following legal entities as a separate "depositor" covered by depositor's interest: (a) an individual; (b) the individual's spouse; (c) a joint account with the individual and his or her spouse; (d) a trust account controlled by the individual for the benefit of his or her spouse; (e) the individual's child's account; etc. There are approximately 12–14 different legal entities which qualify as a separate depositor under the government insurance program. The regulations for these depositor insurance programs classify funds based upon right, title and interest in the funds.

In step 14, information is input into the system regarding each annuity beneficiary AB. Table 1 below shows an exemplary annuity beneficiary record.

TABLE 1

| Initial Annuity Beneficiary Record |
| --- |
| AB Name, Add., AB# (e.g., $AB_1$) |
| B.I. data |
| $AB_1$ — $BI_1$ is checking and savings |
| $AB_1$ — $BI_2$ is savings — unqualified annuity |
| $BI_1$ and $BI_2$ classified as non-available for $AB_1$ |

In Table 1, the name, address, and identification number have been assigned to annuity beneficiary $AB_1$. In addition, $AB_1$ may have checking and savings accounts at a banking institution (BI) which is designated as $BI_1$. Annuity beneficiary $AB_1$ may also have a savings account such as a certificate of deposit (CD) in another banking institution $BI_2$. This CD held by $BI_2$ may be part of an unqualified annuity fund. The use of the term "unqualified" herein does not refer to whether the beneficiary obtains the benefit of special tax considerations but rather refers to an annuity that is not immediately protectable under depositor's insurance program as monitored by the present invention. In a preferred embodiment, banking institutions $BI_1$ and $BI_2$ are as classified as non-available banking institutions for annuity beneficiary $AB_1$. In another embodiment, banks $BI_1$ and $BI_2$ are classified "non-available" only if the annuity beneficiary's account exceeds a predetermined threshold, e.g., $0, $5,000, $10,000 or $30,000. This classification step is similar to classifying a bank as "deposit capped" explained later herein.

Step 16 involves inputting banking institution BI data for each annuity beneficiary AB. Step 18 classifies the banking institution as available or non-available. For example, with respect to beneficiary $AB_1$, banking institutions $BI_1$ and $BI_2$ are classified as non-available. Step 20 involves repeating the inputting and classifying steps 12, 14, 16 and 18 for multiple customers and annuity beneficiaries. Step 22 compiles a matrix or list of banking institutions which are available and non-available. Table 2 below provides an exemplary list.

TABLE 2

| | Banking Institution Matrix | | |
| --- | --- | --- | --- |
| BI# | AVAIL | NON-AVAIL | CONDITION |
| $BI_1$ | $AB_{2,3,4,n}$ | $AB_1$ | A |
| $BI_2$ | $AB_{3,4,n}$ | $AB_{1,2}$ | A |
| $BI_3$ | $AB_{3,n}$ | $AB_{2,4}$ | A |
| $BI_4$ | $AB_{1,2,3,n}$ | $AB_4$ | B |
| $BI_5$ | $AB_{1,3,4,n}$ | $AB_2$ | A |
| $BI_6$ | $AB_{1,2,4,n}$ | $AB_3$ | C |
| $BI_7$ | — | — | A |
| $BI_n$ | $AB_{1-,\ldots n-1}$ | $AB_n$ | A |

Table 2 generally shows banking institutions $BI_1$ through $BI_n$ and whether that institution is available for certain beneficiaries and not available for other beneficiaries. Additionally, the banking institution matrix shows the condition of the bank (A–E) which is directly related to the capital/debt ratio of the bank as well as other factors. An A quality bank is the highest rated bank. These ratings are known in the banking industry. Since a high quality financial product is provided by the present system, annuity funds invested in conjunction with the present system will normally be invested in only top quality banks. As stated earlier, the term "banking institution" includes all federally approved banks and savings and loans. These banking institutions must offer depositors deposit insurance which protects depositors' funds up to a predetermined insurance limit. The banking institution matrix, Table 2, shows that institution $BI_1$ can be used as an available institution by annuity, beneficiaries $AB_2$, $AB_3$, $AB_4$, and $AB_n$. In contrast, institution $BI_1$ is classified as non-available for annuity beneficiary $AB_1$. This initial classification of banking institutions and identification of the annuity beneficiaries' banking institutions may be necessary in order to insure that, in the event of failure of that particular banking institution, the entire annuity fund invested for each beneficiary using the present system is fully insured. If an annuity beneficiary has bought a CD from a particular banking institution or otherwise has funds on deposit and that information has not been entered into the system, the federal deposit insurance may not cover both the investment made under the annuity fund provided by the present system and the independent investment by the annuity beneficiary. In order to provide a high degree of security, the present system gathers initial information regarding the banks used by annuity beneficiaries and class/ties those banking institutions as non-available for the protected annuity monitored by the system.

By monitoring (a) the legal entity recognized as a "qualified and insured depositor" (per the governmental regulations) herein "the annuity beneficiary" and (b) the initial and the current amount in each bank attributable to the annuity beneficiary, the present system provides a financial product (an annuity contract or a life insurance contract) which is insured under depositor's insurance. The monitoring involves accumulating initial data regarding the amount and whereabouts of the beneficiary's funds, monitoring those funds, monitoring the funds associated with the particular contract identified with the beneficiary, and moving excess funds when the sum total exceeds a predetermined amount which is normally a pre set amount near the insured limit (currently insured up to $100,000.00). As can be seen in Table 2, institution $BI_7$ is available for all annuity beneficiaries since there are no beneficiaries who use that institution. Additionally, $BI_7$ is rated as an A institution.

In step 24, information regarding new investments is input into the system. These new investments could be initial investments by the customer to fund an annuity or could be periodic payments by the customer to fund the annuity. These new investments are posted both to the customer records as well as to the annuity beneficiary records. This dual posting is necessary, because the customer will want a full accounting of all payments made into his or her annuity fund and the funds associated with each particular annuity beneficiary must be completely and accurately monitored in order to insure that each annuity beneficiary is protected under the federal depositors' insurance program. As stated earlier, the deposit insurance runs to the annuity contract owner, and the beneficiary may or may not be the customer. For example, a husband may fund an annuity for the benefit of his wife. In that case, the annuity beneficiary (annuitant/contract owner) would be the customer's wife. If the annuity investment or accumulated income plus the principal exceeds $100,000.00 in any particular banking institution (the current regulatory limit for depositors' insurance), the wife's insurable interest would be capped at $100,000.00. Accordingly, it is important to account for all investments made by the customers to fund one or more annuities and also to carefully account and monitor the value of each annuity contract and post that value to an annuity beneficiary record.

In step 26, data is input into the system to post all interest payments made by all institutions on certificates of deposit purchased from those institutions. These interest payments are collected for the benefit of particular annuity beneficiaries. As stated earlier, the company holding the annuity simply establishes an internal account for each annuity beneficiary. The company purchases one or more CDs sold by one or more banking institutions. As long as the internal accounts by the annuity company are not subject to claims by the company's creditors and are specifically designated for the benefit of an annuity beneficiary, the regulations regarding depositor's insurance provide that the annuity beneficiary's investment in a CD or other depository account of a particular banking institution is protected up to the insurable limit.

In step 28, the system compiles due date information for each CD, that is, the principal invested in the CD, the interest generated thereby, and the term of the CD and the interest payment dates. Step 30 involves displaying a money versus time statistic chart. In order to assist the investment manager, it is helpful to know when one or more CDs are coming due, the total investment in the CDs, and all interest payments that have been received or will be received from various banking institutions. This statistical money versus time chart will enable the investment manager to plan both short term and long term CD investments and match those investments with available aggregate funds. Of course, these aggregate funds include new customer annuity investments.

Decision step 32 determines whether the total investment for each annuity beneficiary in each banking institutions exceeds or is greater than an insured limit. The insured limit may be either the actual, government established, depositor's insurance limit value or may be another, lower predetermined insured limit established by the system operator. For example, the current established depositor's limit value is set at $100,000.00. The system operator may, in order increase the security of the funds, set a lower limit at $90,00.00. In any event, a decision is made in step 32 to determine whether a total investment, both principal and interest, for each annuity beneficiary in each banking institution exceeds the insured limit. If the insured limit per AB and per BI exceeds the insured limit, the YES branch is taken and in step 34, that particular banking institution is classified as non-available (NON-AVAIL) for that particular annuity beneficiary. If the NO branch is taken from decision step 32, that is, the insured limit has not been exceeded by the total investment per AB and per BI, step 36 requires re-classification of any banking institution that has returned or paid a CD as an available (AVAIL) banking institution for all annuity beneficiaries who had designated funds in that CD. Step 36 also follows step 34.

The total investment described above in step 32 for a particular bank $BI_y$ and a particular beneficiary $AB_x$, may include independent investments owned by or attributable to $AB_x$ (described earlier with respect to Table 2), which has been entered into the system at step 14, the current value of those independent investments (provided by $AB_x$ or reported to the system by the bank $BI_y$), and the current value of $AB_x$'s qualified annuity fund amount which is covered by the presently described system and protected by depositor's insurance in bank $BI_y$.

Next, decision step 38 determines whether the interest, input in step 26, the new investments paid by a customer, input in step 24, plus the old investments from redeemed CDs exceed a large denomination certificate of deposit (LD-CD) threshold. Generally, an LD-CD is a CD of $5,000,000.00 or higher having a term of at least three years. Historically, these time deposits have a much higher rate of return as compared to individually purchased, smaller denomination short term CDs. If the threshold is not exceeded, the NO branch is taken and in step 40, the total investment is placed in short term CDs (ST-CD). In step 42, the system returns to start step 10. The LD-CD threshold may be set by the system operator, for example, at $10,000,000.00.

In order to better understand the present invention, Tables 3 and 4 below show the investment matrix or list and an expanded annuity beneficiary record. With respect to the investment matrix, and as an example, banking institution $BI_7$ has sold a large denomination certificate of deposit to the annuity, or insurance company. The LD-CD is a $10,000,000.00 CD which falls due in seven years. This $10,000,000.00 was invested by the annuity company at time $t_r$. Interest is paid quarterly on the LD-CD at X% and the interest is automatically placed in a short term (ST-CD) having a three month maturity and paying interest at X-2.0%. The withdrawal penalty on the ST-CD is 0.25% interest.

TABLE 3

Investment Matrix

|  | Time | CD | AB$_1$ | AB$_2$ | AB$_3$ | ... | AB$_9$ | ... | AB$_n$ | Total |
|---|---|---|---|---|---|---|---|---|---|---|
| BI | t$_1$ | LD$_1$ | 90K | 45K | 72K | ... | — | ... | 10K | 10M |
| BI$_7$ |  | ST | — | — | — |  | — |  | — | — |
|  | t$_2$ | LD$_1$ | 90K | 45K | 72K |  | — |  | 10K | 10M |
|  |  | ST$_1$ | 10K | 5K | 7.5K |  | — |  | 1.2K | 23.7K |
|  | t$_3$ | LD$_1$ | 90K | 45K | 72K |  | — |  | 10K | 10M |
|  |  | ST$_2$ | 10K | 10K | 15K |  | 80K |  | 2.4K | 117.4K |
| BI$_8$ | t$_3$ | ST$_3$ | 11K | — | — |  | — |  | — | 11K |

The investment matrix, Table 3, shows that at time t$_1$, the company operating the present system has invested in long term CD LD$_1$ and various annuity beneficiaries have accounts associated with or designating that LD$_1$. For example, annuity beneficiary AB$_1$ has $90,000.00 invested (90K). Beneficiary AB$_3$ has invested $72,000.00 (72K). Annuity beneficiary AB$_9$ has not invested in LD$_1$ at time t$_1$. Annuity beneficiary AB$_n$ has invested $10,000.00 (10K). At time t$_1$, there is no short term (ST) CD issued by institution BI$_7$. At time t$_2$, which is the first quarterly interest payment date for LD$_1$, each annuity beneficiary has the same amount of principal designated for LD$_1$. However, according to the terms of the agreement with institution BI$_7$, a second, short term CD, ST$_1$, has been opened into which all the interest from LD$_1$ is swept. Accordingly, the records of the company issuing the federally insured annuities show that annuity beneficiary AB$_1$ has a designated 10K in CD ST$_1$ issued by institution BI$_7$, beneficiary AB$_2$ has 5K invested in ST$_1$, and beneficiary AB$_n$ has 1.2K invested in that CD. The interest amounts shown in Table 3 are fictitious and simply provide examples for the operation of the system. At time t$_3$, which is the second quarterly payment date for LD$_1$, the interest has been rolled over into a second short term CD, ST$_2$. However, because beneficiary AB$_1$ is at the government insured limit of $100,000.00, his or her allocation has been shifted to a second banking institution BI$_s$ and placed in short term CD deposit ST$_3$. Accordingly, AB$_1$ has a designated investment of $11,000.00 (11K) in short term CD ST$_3$ sold by institution BI$_a$ as well as a 10K designated investment in ST$_2$ at institution BI$_7$. The other beneficiaries AB$_2$, AB$_3$, and AB$_n$, have had their interest payments rolled directly over into short term CD ST$_2$. The investment by or for beneficiary AB$_9$, that is 80K, is a new investment by the customer funding that particular annuity contract. Accordingly, annuity beneficiary AB$_1$ has reached the insured limit in institution BI$_7$ and BI$_7$ is then classified as a non-available banking institution for annuity beneficiary AB$_1$. However, BI$_7$ is still classified as available for AB$_2$, AB$_3$, AN$_n$ and AB$_9$, although AB$_9$ is near the predetermined insurance limit of $100,000.00.

Table 4 which follows shows an expanded annuity beneficiary record.

TABLE 4

Expanded Annuity Beneficiary Record

Basic Data

Cust$_1$; Annuity #1; AB$_1$
NON-AVAIL. BI = BI$_{1,2}$ note: checking and savings BIs
NON-AVAIL. BI = BI$_7$ note: maximum reached at t$_3$

Investment Data

| BI# | Inst'mt # | Invest Date | P'al | Est. Int. | Period | Due Date |
|---|---|---|---|---|---|---|
| BI$_7$ | LD$_1$ | t$_1$ | 90K | 10K | Qtrly | t$_1$ + 7 yrs |
| BI$_7$ | ST$_1$ | t$_2$ | 10K | 1K | Qtrly | t$_2$ + 3 mths |
| BI$_8$ | ST$_2$ | t$_3$ | 11K | 1.01K | Qtrly | t$_3$ + 3 mths |

The basic record includes customer data, that is, who is funding the annuity, and annuity contract identifier (annuity #1) and an annuity beneficiary identifier (AB$_1$). The basic record also includes a record of non-available institutions. BI$_1$ and BI$_2$ and includes a remark stating that those institutions are checking and savings for AB$_1$. Institution BI$_7$ which was classified as non-available at time t$_3$ due to the level of funds in that designated institution. The expanded annuity beneficiary record also includes investment records. The investment record is broken down into banking institution BI$_7$ and BI$_8$, includes instrument numbers CD#, initial investment dates t$_1$, t$_2$ and t$_3$, principal investments made in those particular CDs, estimated interest payments, the interest due dates, and the CD due date. The investment record for each particular annuity beneficiary can also be used as certificate of deposit data for compiling the money and time statistics in step 30. If, for example, a significant influx of new investments was gathered by the system operator (450K) and interest of 50K was available in two weeks and if a 500K short term CD was available in three weeks, the system operator may choose to accept the interest penalty on the 500K short term CD and purchase a large denomination CD ($1,000,000.00) at the time the interest is paid by the other banking institution in two weeks. In the interim, the initial 450K investment could be placed in a short term CD.

In step 44, the system operator places an offer to buy a large denomination CD (LD-CD). These large denomination CDs are sometimes called bank investment contracts. In step 46, the system operator reviews the bids placed by the various banking institutions BI$_1$, BI$_2$ for the large denomination CD. These bids would include all terms associated with the CD including principal amount, number of years, interest due on the principal, and time for interest payments.

In step 50, the banking institution or another third party information provider inputs information relative to the condition of the banking institution, that is, A, B, C, D, or E or other known classifications. The condition of the banking institution is directly related to the capital/debt ratio. Since large amounts of money are placed with a particular institution, the capital/debt ratio may play an important role in determining the ranking of the institutions and the top qualifying bids therefrom. In step 52, the various bids and, more importantly, the banking institutions are rated from high to low. The investment manager or the system operator may work with the system in order to rank the various bids. In step 54, a list of non-available banking institutions is compiled for all annuity beneficiary investors who will participate in the LD-CD investment. Table 4, the expanded annuity beneficiary record, shows non-available banks $BI_1$, $BI_2$ and $BI_7$ associated with annuity beneficiary $AB_1$.

In step 60, a comparison is made between the bid list, the beneficiaries designated to invest and the non-available banking institutions associated therewith. Step 62 is a decision step which determines whether any of the top five ranked banking institutions are classified as non-available for all annuity beneficiaries who will invest in the designated CDs offered by the top five institutions. Assuming that all top five institutions are not classified as non-available, that is they are available, step 64 involves selection of one of the top five bids. Step 66 commands the investment of the money into the selected banking institution and particularly the purchase of the large denomination, relatively long term CD.

In step 68, a compilation of customer data, annuity beneficiary data, and banking institution data is prepared. Reports are generated and posted. For example, customers will want to know the total investments directed to a particular annuity contract, the value of the annuity contract account, the interest generated by that account, and may be concerned regarding the insurance protection offered under this system. Accordingly, a report showing the non-available banks for a particular annuity beneficiary may be prepared for each customer. In any event, the investment manager for the system should use a listing of non-available as well as available banking institutions in order to properly invest the funds. In step 70, the system pays money to beneficiaries under annuitized contracts or redeems contracts that have been canceled. These payments are posted and the appropriate notations are made in the customer records, annuity beneficiary records and investment matrices. Of course, certain institutions would be reclassified as available if beneficiary funds therein dropped below the insured level. Step 72 returns the program to its beginning, start step 10.

Returning to decision step 62, the YES branch goes from jump point A1 in FIG. 1A to jump point A1 in FIG. 1B. Stop 80 shows the beneficiary ID, AB#, the investment amount for that beneficiary and the ranked but non-available banking institution. This is a result of the decision step 62 determining that one or more of the top five ranked banking institutions have been designated as non-available for one or more beneficiaries. Of course, rather than ranking five institutions in step 62, ten institutions could be ranked and analyzed in step 80. Five institutions are ranked herein as an example. Following step 80, decision step 82 determines whether the particular investment for a particular annuity beneficiary is less than a dollar threshold value ($THRES). The YES branch from decision step 82 enters step 84. If the investment for a particular annuity beneficiary is small, for example the 2.4K investment in short term deposit $ST_2$ for annuity beneficiary $AB_n$ in Table 3, 2.4K, the 2.4K investment is shifted to a short term CD in another bank $BI_n$. Alternatively, the small investment for the annuity beneficiary can be placed on deposit with any institution that is classified as available. The funds need not be placed in a time deposit (i.e., CD) to obtain the benefit of depositor's insurance. However, it would be prudent to use CDs rather than designate checking or savings accounts due to the higher return on investment. Step 86 removes the beneficiary's investment from the large denomination CD investment. This enables the system to use the top ranked institution for all beneficiaries except $AB_n$. Step 88 repeats steps 80, 82, 84, 86 for all annuity beneficiaries having designated funds and non-available classifications for the ranked banking institutions. This repetition is shown by the system returning to step 80.

If the NO branch from decision step 82 is taken, in step 90, the ranking of the banking institutions is changed. For example, if $AB_9$ having a deposit of 80K is larger than the money threshold used in step 82, (see Table 3), it is beneficial to change the ranking of the top five banking institutions such that the top ranked institution is placed at the bottom of the five stacked institutions. Decision step 92 determines whether all five banking institutions have been reviewed. If not, the NO branch is taken and in step 94, the next ranked banking institution is used and steps 80 and 82 are repeated. Of course, if the next ranked banking institution is not designated as non-available by any annuity beneficiaries, the program would jump to step 64, the select banking institution in FIG. 1A.

If the YES branch is taken from decision step 92, decision step 96 determines whether all top ten ranked banking institutions have been reviewed. If all ten top ranked institutions have been reviewed resulting in all ten institutions classified as non-available and having substantial beneficiary participation in the LD-CD), the YES branch is taken and step 98 shows the top ten ranked institutions, prompts the system operator to change the money threshold ($THRES) in decision step 82, and repeats the process beginning at jump point A1 with the old ranking. If the NO branch is taken from decision step 96, that is, not all top ten institutions have been reviewed, step 100 uses the next group of five ranked institutions, that is institutions six through ten. The program returns to step 80 which shows whether institutions six through ten are designated as non-available by any annuity beneficiary. This process continues until a particular banking institution is selected and jump point B1 returns to select institution step 64 in FIG. 1A. Other automated selection routines could be used to select institutions.

Figure 2:
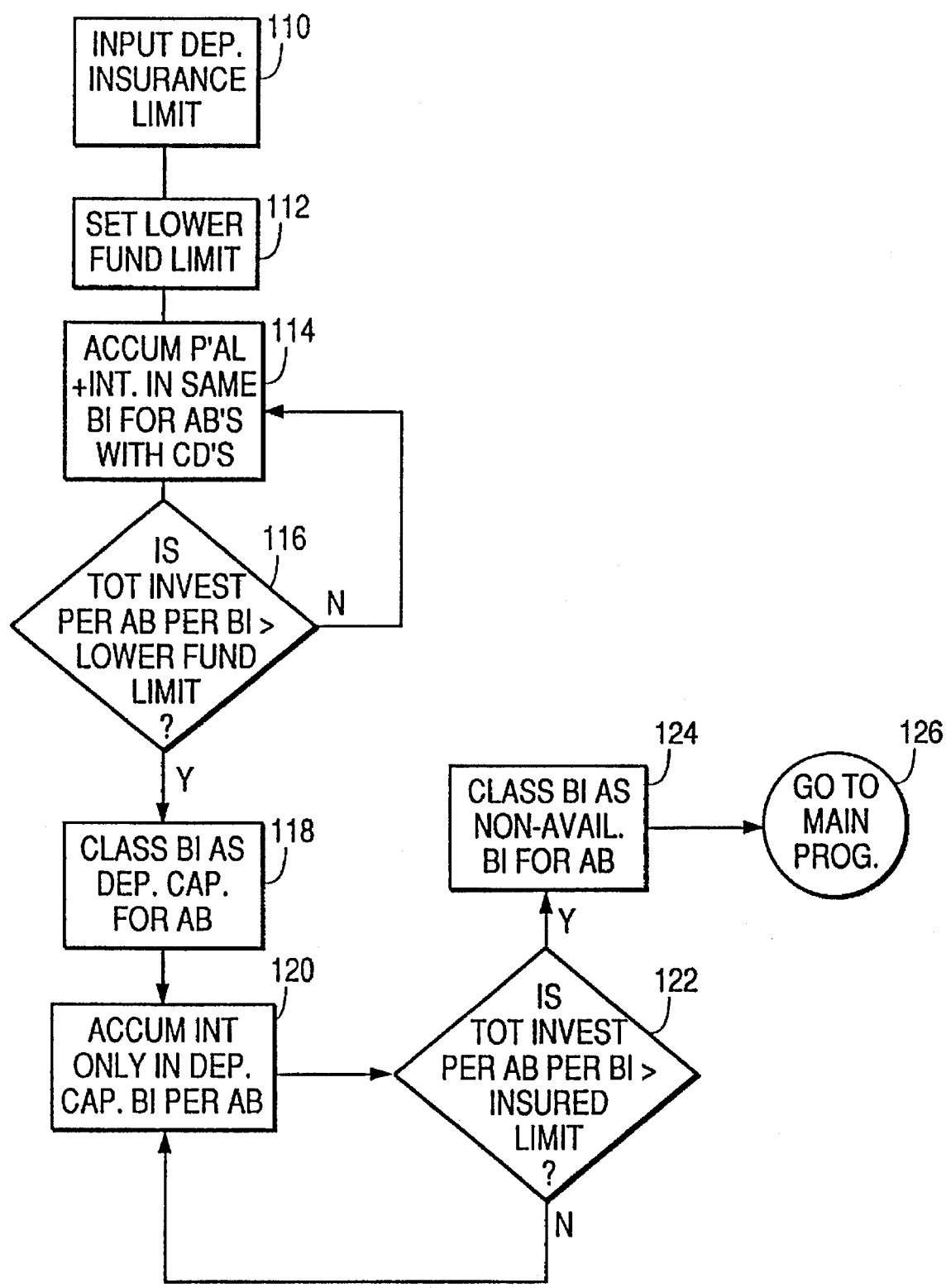
FIG. 2 diagrammatically illustrates a method and system permitting the accumulation of interest in a particular banking institution.

The system may be modified such that interest paid by a particular banking institution based upon a first CD investment is automatically swept into a second CD investment at the same bank. In this modified system, two limits are set, a lower fund limit which designates a banking institution as an deposit capped institution, and an insured limit which ultimately is used to classify the banking institution as non-available. FIG. 2 diagrammatically shows this aspect of the system. In step 110, data is input into the system regarding the government established, depositor's insurance limit value. Step 112 establishes a lower fund limit which is less than the depositor's insurance limit value. In step 114, the interest and principal are accumulated in the same banking institution for all annuity beneficiaries (one of which is $AB_c$) having designated CDs in that particular institution. The interest is preferably swept into a CD. However, if the interest is swept into any type of deposit account at the institution, whether a time deposit or other account, the annuity beneficiary obtains the benefit of depositor's insurance. This feature of using other types of deposit accounts is encompassed by the present system and is sometimes referred to herein as a "deposit instrument" available at the bank. Decision 116 determines whether the total investment for each annuity beneficiary $AB_c$ for that particular banking institution $BI_p$ exceeds the lower fund limit. The NO branch from decision step 116 returns to step 114, accumulate principal and interest in the same $BI_p$. At this point, new investments can be posted to the bank $BI_p$ for the beneficiary $AB_c$.

The YES branch from decision step 116 enters step 118 which classifies the particular banking institution $BI_p$ as deposit capped for a particular annuity beneficiary $AB_c$. For example, the investment manager of the system should know that a large investment by a particular annuity beneficiary in a particular CD will generate a certain amount of interest over a certain period of time. For example, a $50,000.00 investment in a large denomination, seven year CD may generate $50,000.00 in interest over the total term of the CD. If a particular annuity beneficiary $AB_c$ is designated as the beneficiary of a $50,000.00 annuity and that sum was an initial investment in that CD, that banking institution would be classified as deposit capped (the lower fund limit set at $50,000.00) for $AB_c$ and all interest assigned to that annuity beneficiary $AB_e$ would be swept into short term and possibly long term CDs with that particular banking institution $BI_p$. All CDs would mature on or before the seven year maturity date of the large denomination CD with the institution. In this instance, the lower fund limit would be set at $50,000.00.

Step 120 follows step 118 and only interest is accumulated in the deposit capped banking institutions for the particular annuity beneficiary. In other words, no new principal investments would be made for that beneficiary $AB_c$ in that particular banking institution $BI_p$. Only interest would accumulate in $BI_p$ for $AB_c$. Decision step 122 follows step 120 and a determination is made whether the total investment per annuity beneficiary in each banking institution exceeds the insured limit. The insured limit is set at $100,000.00. The NO branch returns to accumulate interest step 120. The YES branch leads to step 124 which classifies the particular banking institution as a non-available institution for the particular annuity beneficiary. Step 124 leads to jump step 126 GO BACK TO MAIN PROGRAM. The main program would be entered at any convenient point, possibly immediately before step 32.

Although the example provided herein regarding the large denomination CD involves rolling over the interest in a short term CD, it is most likely that under the terms of the LD-CD, the interest would be allowed to accumulate with the principal and such interest would be compounded with the principal. The interest rate on the accumulated fund would be the interest rate for the LD-CD.

The present invention can be used for monitoring annuity funds for any type of annuity. For example, some annuity contracts provide for an initial large payment, for example $1,000,000.00, which would be deposited in at least ten institutions under the present system, and the annuity pays periodically, for example quarterly, $30,000.00 to the annuity beneficiary.. Mother type of annuity funds a retirement plan for the annuity beneficiary. When the annuity beneficiary reaches retirement age, at age 65, the annuity contract may be annuitized and a lump sum payment or other payment plan is made to the annuity beneficiary. The annuity beneficiary may decide to receive periodic payments for a number of years rather than a lump sum. This retirement annuity is called a deferred annuity. The deferred annuity has certain tax advantages such that interest accumulated on the principal is accumulated tax free. If the principal or interest are withdrawn from a deferred annuity before retirement age, there are adverse tax consequences associated with such withdrawal.

The order of the steps set forth above is only exemplary. For example, the pay annuity step 70 may precede the display money and time statistics step 30. The classification of banks, steps 32, 34 and 36 can precede step 60. These modifications fall within the spirit and scope of the present invention.

The present system has been described as monitoring annuity funds deposited in federally approved banking institutions. However, the government regulations also provide insurance for funds deposited in such institutions in accordance with a life insurance program. As is known, a life insurance contract, funded by a customer, customarily provides that, upon death of a named individual, the life insurance company will pay one or more named life insurance beneficiaries. Whole life insurance contracts permit the customer or a named individual to withdraw money from the life insurance fund or borrow against the fund before the death of the named individual. The life insurance beneficiary, and the person entitled to withdraw or borrow against the life insurance fund (the policy owner) is called herein a "life insurance designee" or simply "beneficiary." The government regulations provide that funds deposited in a federally approved banking institution by a life insurance company under a life insurance contract for the benefit of a life insurance designee are insured by depositor's insurance up to the established government insurance limit. Accordingly, the present system described above with respect to FIGS. 1A, 1B and 2 can be easily adopted by a life insurance company to reap the benefits of depositor's insurance. Rather than monitoring annuity beneficiaries, the system monitors life insurance designees' institutions and life insurance designees' funds deposited in the approved and available banking institutions. The claims appended hereto are meant to cover this alternate embodiment of the present invention.

As stated earlier, in order to ensure that a qualified annuity fund (a fund of money specifically designated to be protected by depositor's insurance) qualifies for the depositor's insurance, the data processing system may continually monitor the qualified annuity fund data plus the unqualified annuity fund data plus the non-annuity fund data, may periodically monitor that investment data or may utilize transactional parameters which do not require immediate and timely electronic monitoring of unqualified and non-annuity fund data. In other words, the electronic processing of transactional data system may continually monitor the funds, may periodically monitor the funds or may monitor only the qualified annuity fund data without concern for the unqualified and non-annuity fund data. As used herein, the term "continually monitor" refers to a data processing and transactional system which monitors funds data daily or at least every 10 business days. Ten business days is selected for the continual monitoring system because interest will most likely be posted to the principal of the qualified annuity fund (a deposit account or CD) no sooner than every 10 business days. If interest is posted at different time periods, the continual monitor data processing system should be modified to take into account the shorter or longer posting cycle.

The periodic monitoring transactional data system acquires data from the customer, the annuity beneficiary (AB) and the various banking institutions (BI) or banks less often than the continual monitoring system. For example, the periodic monitoring system may acquire or update unqualified annuity fund and non-annuity fund data (identified in FIGS. 3B–3D as "N+UNQ Fund Data" referring to non-annuity and unqualified annuity fund data respectively) on a quarterly basis.

In contrast to the continual monitoring system and the periodic monitoring system, the transactional data system may avoid monitoring the unqualified annuity, fund data and non-annuity fund data by simply disqualifying or classifying those banks as non-available (N/A) banks. Alternatively, the nominal or non-monitor system may shift the burden to identify and quantify the non-annuity fund and unqualified annuity fund data and related bank data to the customer. In this low level system, the fund and bank data may be updated yearly by electronically entering data based upon information supplied by the customer/beneficiary from, for example, a written questionnaire.

Figure 3A:
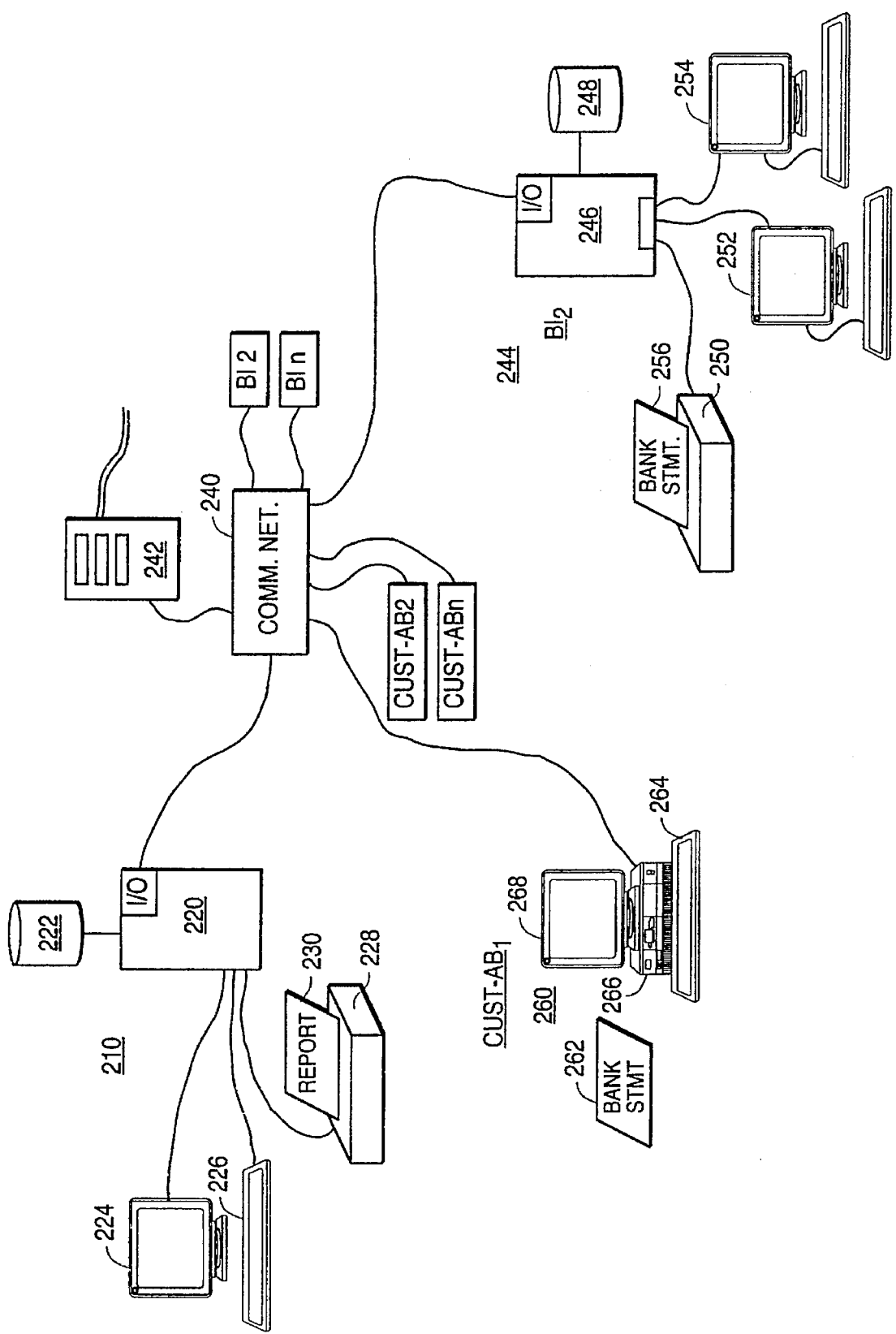
FIG. 3A diagrammatically illustrates the major components of a system to continually, periodically or nominally monitor the funds and investments.

FIG. 3A diagrammatically illustrates the major components of a system which can be utilized to continually, periodically or nominally monitor the funds and investments. In all instances it is necessary to monitor the qualified annuity fund data which includes the principal held in the qualified or insured annuity fund as well as the earnings or interest created by that principal on deposit with a particular bank $BI_n$. The computer hardware and telecommunication system described and illustrated in FIG. 3A is only exemplary. The system illustrated in FIG. 3A includes five major elements which can be reconfigured dependent upon the complexity or simplicity of the transactional data and monitoring system. Element 210 generally illustrates the computer components located at the life insurance company or other company administering the financial fund system and data. As stated earlier, only life insurance companies can issue annuities or life insurance policies. If other legal entities can issue annuities and life insurance policies or administer the resulting funds and be permitted under the current bank regulations to obtain the benefit of depositor's insurance for their customers at approved bank institutions, the term "life insurance company" is meant to cover those entities.

At company location 210, a computer system 220 is utilized. Computer system 220 is electronically connected to a large data storage device 222, a monitor 224, a keyboard 226 and a printing device 228. A printed out report 230 has been developed by printing device 228. The company having computer system 210 monitors the annuity fund through a telecommunications network 240. The telecommunications network 240 links sources of electronic investment information such as the New York Stock Exchange electronic bulletin board 242 which shows not only the value of various equity and debt investments but also the net asset value (NAV) of various mutual funds. Telecommunications network 240 is also electronically connected to various banks or banking institutions, and particularly one bank $BI_1$, which includes computer system 244. Telecommunications network 240 is also connected to banking institutions $BI_2$ and $BI_n$ as shown in FIG. 3A. It is known in the industry that banks $BI_2$ and $BI_n$ include data processing computer systems similar to that shown as computer system 244 for $BI_1$. Computer system 244 includes a central computing unit 246 connected to telecommunications network 240 via an input/output (I/O) device. Computer unit 246 is also electronically connected to a large data storage unit 248, a printing device 250 and a plurality of work stations, two of which are work stations 252 and 254. Each work station includes a monitor and a keyboard. Printing device 250 has developed a printed report or bank statement 256.

Telecommunications network 240 is also connected to a number of customers. Customer-Annuity beneficiary CUST-$AB_1$ has a personal computer 260. Customer-$AB_2$ and Customer-$AB_n$ are also connected to telecommunications network 240. The personal computer system 260 for customer-$AB_1$ may electronically acquire information regarding unqualified annuity funds and non-annuity funds owned by Customer-AB from banks $BI_1$, $BI_2$ . . . . . $BI_n$ or the customer may input this information from his or her bank statement 262 via keyboard 264 into computer unit 266. Of course, personal computer system 260 includes a monitor 268. As a further enhancement of the present system, life insurance company 210 or the company monitoring the transactional data for the qualified annuity fund may down load or permit electronic access by Customer-$AB_1$ into an approved electronic file rather than sending the customer-annuity beneficiary a printed out report.

The claims appended hereto are meant to cover these modifications of the present invention.

In FIG. 3A, reference is made to a customer-annuity beneficiary because, as explained later, the customer initially establishes the account for the benefit of one or more annuity beneficiaries. The customer may be the annuity beneficiary identified in the contract. Further, the customer may identify himself or herself as part of a group which together is legally considered to be a single annuity beneficiary.

The following annuity beneficiary list provides a short list of annuity beneficiaries that are linked by a family relationship to a particular customer. Each one of these individuals or legally recognized groups of individuals constitutes a single annuity beneficiary under the current regulations covering the depositor's insurance program. Persons having knowledge of the depositor's insurance program can identify up to fourteen different annuity beneficiaries having family relationships with a particular customer. The following annuity beneficiary list is simply a short list and is illustrated herein as an example. The present invention is meant to cover these and other legally recognized annuity beneficiaries.

| Annuity Beneficiary List |
| --- |
| $AB_1$ = customer individually |
| $AB_2$ = customer and spouse jointly |
| $AB_3$ = spouse individually |
| $AB_4$ = customer for the benefit of child A |

This annuity beneficiary list provides an example of a subset of annuity beneficiary data which can be approved by a customer when establishing or entering the system in accordance with the principles of the present invention.

The present transactional data system can be utilized in conjunction with a single, federally approved banking institution or bank as well in conjunction with as multiple banks. The following single bank routine table illustrates the general aspects of the present invention utilized in conjunction with a single bank.

| Single Bank Routine Table |
| --- |
| id AB |
| issue annuity or life insurance contract (K) |
| invest principle ($P) in special account (acct) for AB (right, title and interest) |
| monitor all AB acct. balances |

Single Bank Routine Table determine if total exceeds predetermined fund threshold
if excess, do something with overage with respect to $P and
earned interest in special AB acct
    change AB status on account (to a different right,
    title and interest).
    open a new AB acct and move excess to
    new AB acct.
    transfer excess funds to another bank.

Relating the single bank routine table to FIGS. 1A and 1B, steps 12 and 13 are encompassed in the first element of the single bank table which is identification of the annuity beneficiary (AB). The company issuing the contract, be it an annuity contract or a life insurance contract, then issues the contract to the customer and particularly for the benefit for the annuity beneficiary. The transactional data and processing system in accordance with the present invention then invests the principal of that contract into a special account for the benefit of the annuity beneficiary. The regulatory agency controlling the depositor's insurance program identifies an annuity beneficiary, as having a certain right, title and interest in and to the account. See the annuity beneficiary list above. Similar to steps 24 and 26 in FIG. 1A, the single bank routine table monitors the annuity fund data for all annuity beneficiary accounts. In a similar manner to step 32, the single bank routine determines whether the total exceeds a pre-determined fund threshold. If the total exceeds that pre-determined fund threshold, the transactional data processing system must do something with respect to the excess or overage. The choices are: (a) change the annuity beneficiary to a different annuity beneficiary, that is, one of the pre-approved annuity beneficiaries from the subset of approved annuity beneficiaries shown in above in the annuity beneficiary list; (b) open a new annuity beneficiary account with one AB from the pre-approved subset of annuity beneficiaries and move the excess funds to that new AB account; or, (c) transfer the excess qualified annuity funds to another banking institution. This transfer is encompassed by steps 64 and 66 in FIG. 1A.

Figure 3B:
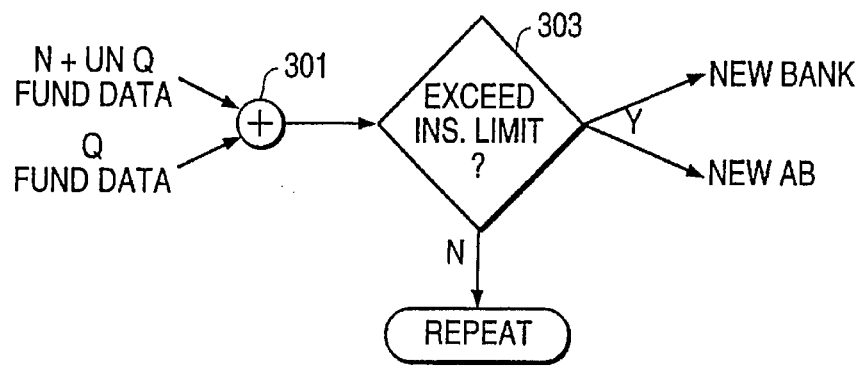
FIGS. 3B, 3C and 3D diagrammatically illustrate data flow charts showing continual, periodic and nominal monitoring of qualified funds.
Figure 3C:
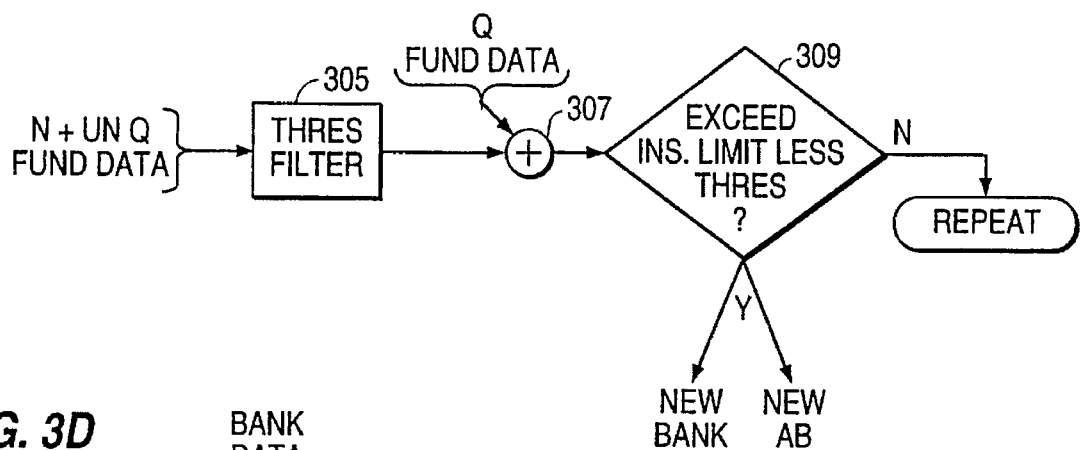
Figure 3D:
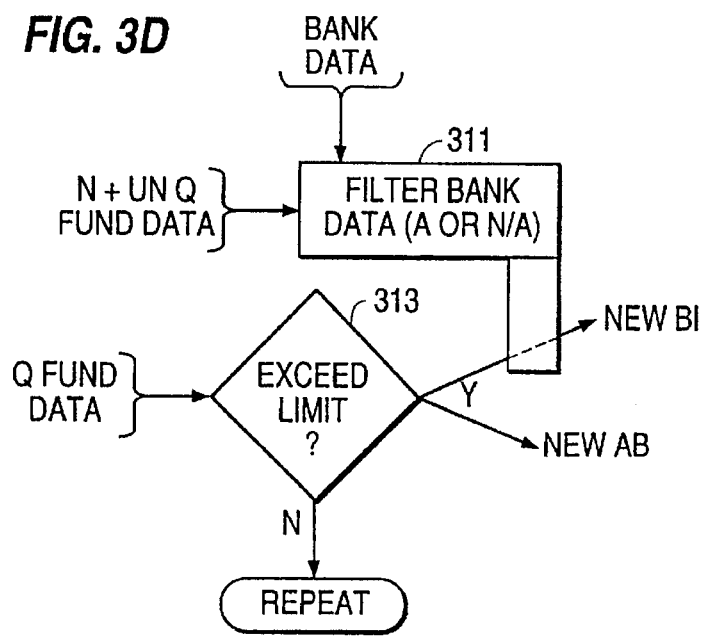

FIGS. 3B, 3C and 3D diagrammatically illustrate data flow charts showing continual, periodic and nominal monitoring of qualified annuity or life insurance funds. With respect to FIG. 3B, the non-annuity and unqualified annuity fund data (N+UNQ fund data) is acquired and summed at summation point 301 with qualified fund data (Q fund data). As discussed earlier, a "qualified" annuity or life insurance policy fund is one which is subject to the depositor's insurance described herein. After this fund data (Q+N+UNQ) is summed at summation point 301, the information is feed into a decision unit 303 which determines whether the combined fund data exceeds the depositor's insurance limits. If it does not, the data flow process repeats thereby acquiring non-annuity fund and unqualified annuity fund data and qualified annuity fund, summing the data and continually monitoring whether the total sum exceeds the insurance limit. If the insurance limit is exceeded, the YES branch is taken from decision unit 303 and either (a) new bank BI is utilized and excess qualified annuity funds (earnings or interest) are invested in the new bank (this system is disclosed in FIGS. 1A and 1B) or (b) the transactional data and monitoring system opens a new annuity beneficiary account for a different annuity beneficiary from the pre-approved subset and puts the excess funds in that new AB account. If the customer approves a subset of annuity beneficiaries such as the subset listed in the annuity beneficiary list above, the system could simply electronically transfer the access funds into that new AB account. As used herein, reference to "opening a new AB account" encompasses the concept that a new account was initially opened by the customer with nominal sums ($1.00) when he or she established the annuity fund. For example, a nominal deposit amount may have been established in a particular banking institution for $AB_1$, $AB_2$, $AB_3$ and $AB_4$. When the $AB_1$ exceeds the insured limit, excess qualified annuity funds (earnings) could be deposited into $AB_2$ account automatically. Accordingly, the system diagrammatically illustrated in FIG. 3B can operate on a single bank or can operate in conjunction with multiple banks and generally describes a continual monitoring and transactional data system. The data acquisition regarding fund data could be acquired daily or every other week.

FIG. 3C illustrates another type of data acquisition system encompassed by the present invention. Non-annuity fund data and unqualified annuity fund data is feed into a threshold filter 305. This threshold filter is generally similar to the pre-determined threshold discussed earlier. In other words, unless the non-annuity fund data and unqualified annuity fund data exceeds the dollar amount threshold established for threshold filter 305, that data does not pass through to summation point 307. If the non-annuity and unqualified annuity fund data does exceed the threshold established in filter 305, this information is passed on either as a direct value or as some representation of that value into summation point 307. Qualified fund data is applied to summation point 307. For example, a representative value of the N and UNQ data can be applied to summation point 307 representing, in one alternative embodiment, one of a tiered level. For example, threshold filter 305 may identify tiers of $1,000, $5,000, $10,000 and $15,000. If the non-annuity and unqualified annuity fund data is less than a $1,000, the output of threshold filter 305 would be 0 into summation point 307. If that non-annuity and unqualified annuity fund data is less than $5,000 but more than $1,000, the filter 305 would generate a $5,000 representation into summation point 307. If the qualified fund data plus the $5,000 data representation at summation point 307 exceeds, in accordance with decision step 309, the insurance limit, the YES branch would be taken and either the excess funds from the qualified annuity fund would be placed in a new banking institution or the excess funds would be placed into a new AB account which would be a subset of approved AB accounts. Of course, rather than passing just a representation of the value of non-annuity and unqualified annuity data through threshold filter 305, the actual value of that non-annuity and unqualified annuity fund data over the threshold could be passed through summation point 307. In that instance, the insurance limit would be reduced by the threshold established in threshold filter 305. This is sometimes referred to herein as a "pre-determined fund limit." Accordingly, if the sum generated by summation point 307 exceeds this reduced pre-determined fund limit, the YES branch would be taken. If the NO branch is taken from decision step 309, the system simply repeats the periodic monitoring function. The system described above in conjunction with FIG. 3C could be utilized to periodically monitor the value of the $AB_1$ accounts in certain banking institutions or in a single banking institution. Periodic monitoring may be acceptable in that the customer/annuity beneficiary need not confirm the precise value of non-annuity and unqualified annuity funds in each particular banking institutions at each data acquisition cycle. The customer/AB could simply identify a particular threshold at each banking institution for each AB account which does not exceed one of a number of deposit thresholds which are equivalent to the tiers in filter 305. This is discussed later in conjunction with the deposit threshold table.

FIG. 3D diagrammatically illustrates a data flow chart for a nominal monitoring system for non-annuity and unqualified annuity fund data. In this data processing system, banking institution or bank data and non-annuity and unqualified annuity fund data is fed into a bank filter 311 which simply identifies whether the bank is available or non-available based upon the presence or absence of funds in excess of a pre-determined threshold or level. These are non-annuity funds and unqualified annuity funds in a particular bank. In contrast thereto, qualified annuity, fund data is applied in a substantially continual manner to an exceed limit decision step 313. If the qualified annuity fund, principal plus all interest earnings, does not exceed the limit, the NO branch is taken and the system continues to accept data as necessary. Particularly, the qualified annuity fund data must always be monitored in order to ascertain whether the principal plus accumulated interest or earnings at a particular banking institution exceeds the pre-determined fund limit. If the qualified fund data exceeds the limit, the YES branch is taken and, in one embodiment, these excess funds are invested in a new banking institution BI which has been filtered in accordance with bank filter 311. In other words, only available or "A" classified banking institutions would be utilized to hold or retain these excess qualified annuity funds. Alternatively, if the YES branch is taken, the excess funds could be deposited in a new annuity beneficiary account which is a subset of the approved AB accounts established by the customer when he or she established or entered the system.

Figure 4:
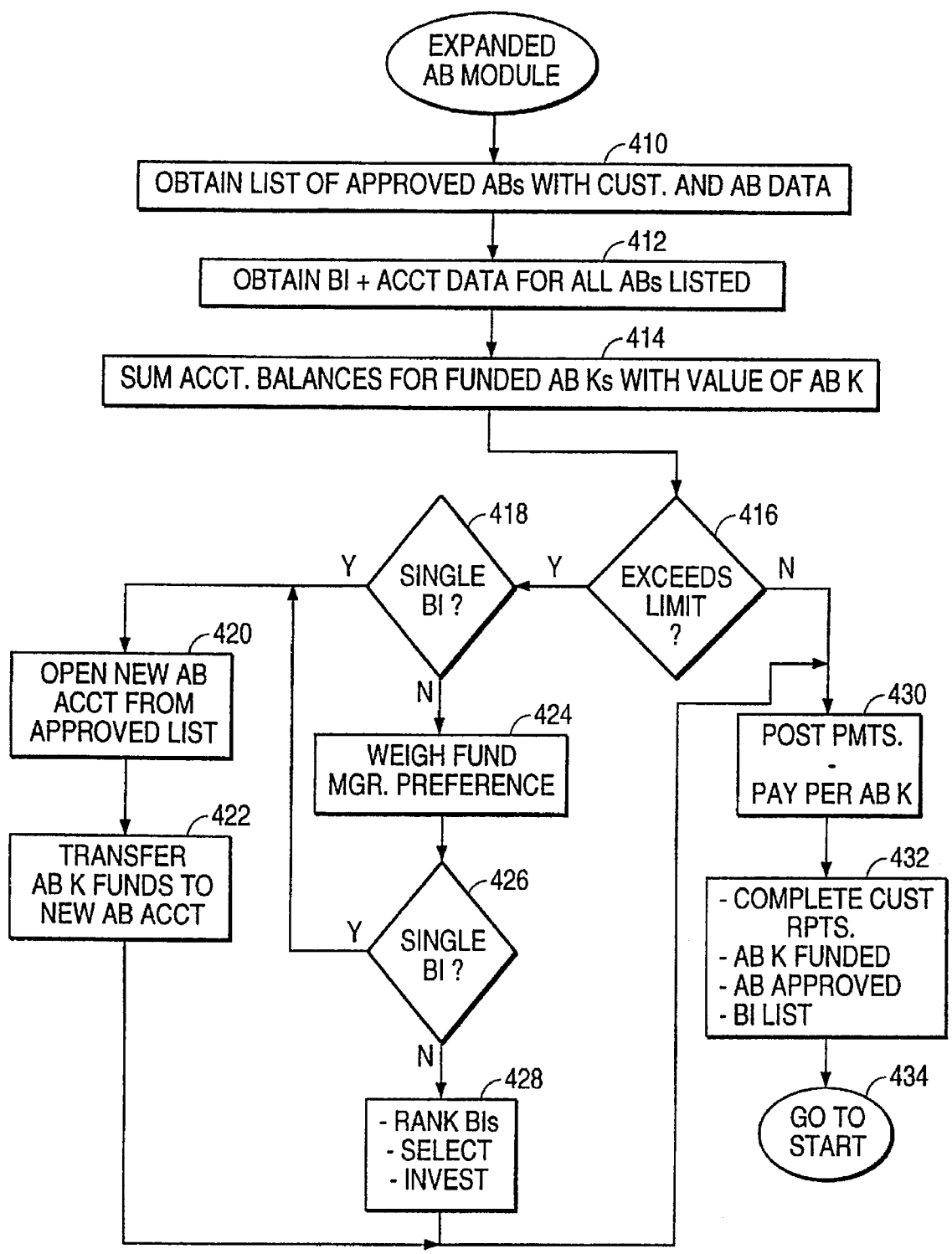
FIG. 4 diagrammatically illustrates an expanded or approved list beneficiary module or program.

FIG. 4 diagrammatically illustrates an expanded or approved list annuity beneficiary module. In set 410, the transactional data and fund monitoring system obtains a list of approved annuity beneficiaries along with the customer and AB data for each annuity beneficiary. The approved list of annuity beneficiaries may be similar to the annuity beneficiary list set forth above. In step 412, the system obtains banking institution and account data for all annuity beneficiaries listed in the approved list. In step 414, the system sums all account balances for all annuity beneficiaries on a per annuity and per bank basis. Particularly, step 414 ascertains earnings and principal held by a particular bank for the benefit of a particular annuity beneficiary.

Decision step 416 determines whether the sum obtained in step 414 exceeds a certain insured limit. Data acquisition step 414 may also acquire data relating to unqualified annuity funds as well as non-annuity fund data.

If the sum exceeds the insured limit or a pre-determined fund limit, the YES branch is taken and decision step 418 determines whether a single bank system is being utilized. If the YES branch is taken from step 418, step 420 opens a new annuity beneficiary account from the approved list of annuity beneficiaries. Step 422 transfers funds from the identified over limit annuity beneficiary account into the new annuity beneficiary account. If the NO branch is taken from decision step 418, that is, the system is not working in conjunction with a single bank, step 424 weighs the fund manager preference. For example, the fund manager may have determined at an earlier time, that he or she wants all funds invested in a certain banking institution unless a second banking institution has a better rate of return, has a higher bank rating or whatever. Unit 424 permits the system to be customized in this manner. Decision step 426 determines whether the funds should be held in a single bank. If the YES branch is taken, the system returns to a point immediately preceding step 420. If the NO branch is taken from decision step 426, step 428 ranks the banking institutions available, selects a new institution and invests the excess annuity funds into that account. The output from step 428 merges with the NO branch from decision step 416.

The NO branch from decision step 416 is followed if the annuity funds plus all other funds accumulated in data acquisition step 414 exceed the pre-determined fund limit. In such a situation, the program or module executes step 430 which posts payments such as earnings etc. to a particular account and issues instructions to pay certain annuity beneficiaries if a particular type of annuity contract has been established. As stated earlier, some annuity contracts pay the annuity beneficiary a monthly sum of money. Other annuity contracts simply accumulate money and release that money or a portion thereof upon a certain occurrence, such as when an annuity beneficiary or another person reaches a certain age i.e. 65 years of age.

In step 432, the system compiles customer reports which disclose, for example, the following: funded annuity beneficiary contracts; a list of approved annuity beneficiaries identified by the customer; the date these accounts were established; and a list of the banking institutions either affected or influenced by the present system. Step 434 returns to the start of the program.

As stated earlier with respect to the various parts of FIG. 3, it may be beneficial, rather than to continually monitor the sum of all annuity beneficiary accounts (qualified, unqualified and non-annuity accounts), that the system simply identify, in conjunction with the customer/annuity beneficiary whether the annuity beneficiary has funds in a certain bank above a certain threshold. The deposit threshold table which follows identifies an example of such a system.

| Deposit Threshold Table |
| --- |
| For Each Bank |
| Tier 1: less than $5,000 in an identified AB acct |
| Tier 2: $5,000–10,000 in an AB acct |
| Tier 3: over $10,000 in an AB acct |

In the deposit threshold table, the thresholds have been established as below $5,000, between $5,000 and $10,000 and above $10,000. When the annuity fund is initially established, the customer may simply be required to identify all banking institutions at each tier. Banks below tier 1 may be identified but those banks may not be affected by the present system. In other words, the data processing system can be established such that rather than monitor the value of all AB funds continually, only funds in excess of a certain threshold and the related banks would be monitored. Banks at tier 1 are not monitored because the qualified annuity funds in these banks will not exceed $95,000.

The monitorization can be shifted to the customer such that the customer would be required to identify whether a bank has more than $5,000 or between $5,000 and $10,000 or over $10,000. Banks holding in excess of $10,000 for particular annuity beneficiary may be classified as non-available. Otherwise, those banks may be identified as having a lower pre-determined fund threshold. For example, if a $10,000 threshold or tier 3 bank were identified, the pre-determined fund limit may be set at $90,000 in that bank wherein the actual depositor's insurance limit is $100,000. In that case, the system could monitor different fund limits for different banks for different annuity, beneficiaries. The deposit threshold can be utilized such that the customers and annuity beneficiaries can be requested to update this information on what tier each bank falls within quarterly or yearly basis. Accordingly, this system periodically monitors N and UNQ funds. In an electronic monitoring system, the customer-AB may give the system operator authority to access bank account data to monitor the N and UNQ funds.

The account data table which follows provides an example of such periodic monitoring. Also, the account data table may be part of the printed out report delivered to the customer and annuity beneficiary periodically along with information regarding the value of the annuity fund.

| Account Data Table |
|---|
| Approved AB's |
| primary    customer individually is $AB_1$ |
| secondary  customer and spouse jointly is $AB_2$ |
| tertiary   customer's spouse is $AB_3$ |
| List Banks Holding Funds |
| customers individual ($AB_1$) |
|   list banks |
|     id deposit threshold tier |
|       less than $10K |
|       $10K to $15K |
|       $15K to $20K |
|       over $20K |
| customer and spouse joint account ($AB_2$) |
|   list banks |
|     id deposit threshold tier |
| customer's spouse individually ($AB_3$) |
|   list banks |
|     id deposit threshold tier |

In the account data table, the customer or annuity beneficiary must identify primary, secondary and tertiary annuity beneficiaries. These are identified in the exemplary table as $AB_1$, $AB_2$ and $AB_3$ which are, respectively, the individual customer, the customer and his or her spouse jointly and the customers spouse. The regulations governing the depositor's insurance recognize that $AB_1$, $AB_2$ and $AB_3$ are different annuity beneficiaries since each entity has a different right, title and interest in and to the annuity fund established therefor. This is a subset of approved ABs for the customer-AB. The account data table continues by requesting or showing information from the customer/annuity beneficiary and identifying each bank holding funds on behalf of the particular annuity beneficiary. Accordingly, the individual customer $AB_1$ must identify all banks and the deposit threshold tier for each bank. Does the bank hold less than $10,000, between $10,000 and $15,000, between $15,000 and $20,000 or over $20,000? It should be appreciated that appropriate deposit thresholds may be selected for the particular system established for a singular bank, multiple banks or banks within a certain family of companies. The account data table may continue to list each annuity beneficiary of the subset of approved annuity beneficiaries and require that the customer/annuity beneficiary identify the tier associated with a particular bank.

Figure 5:
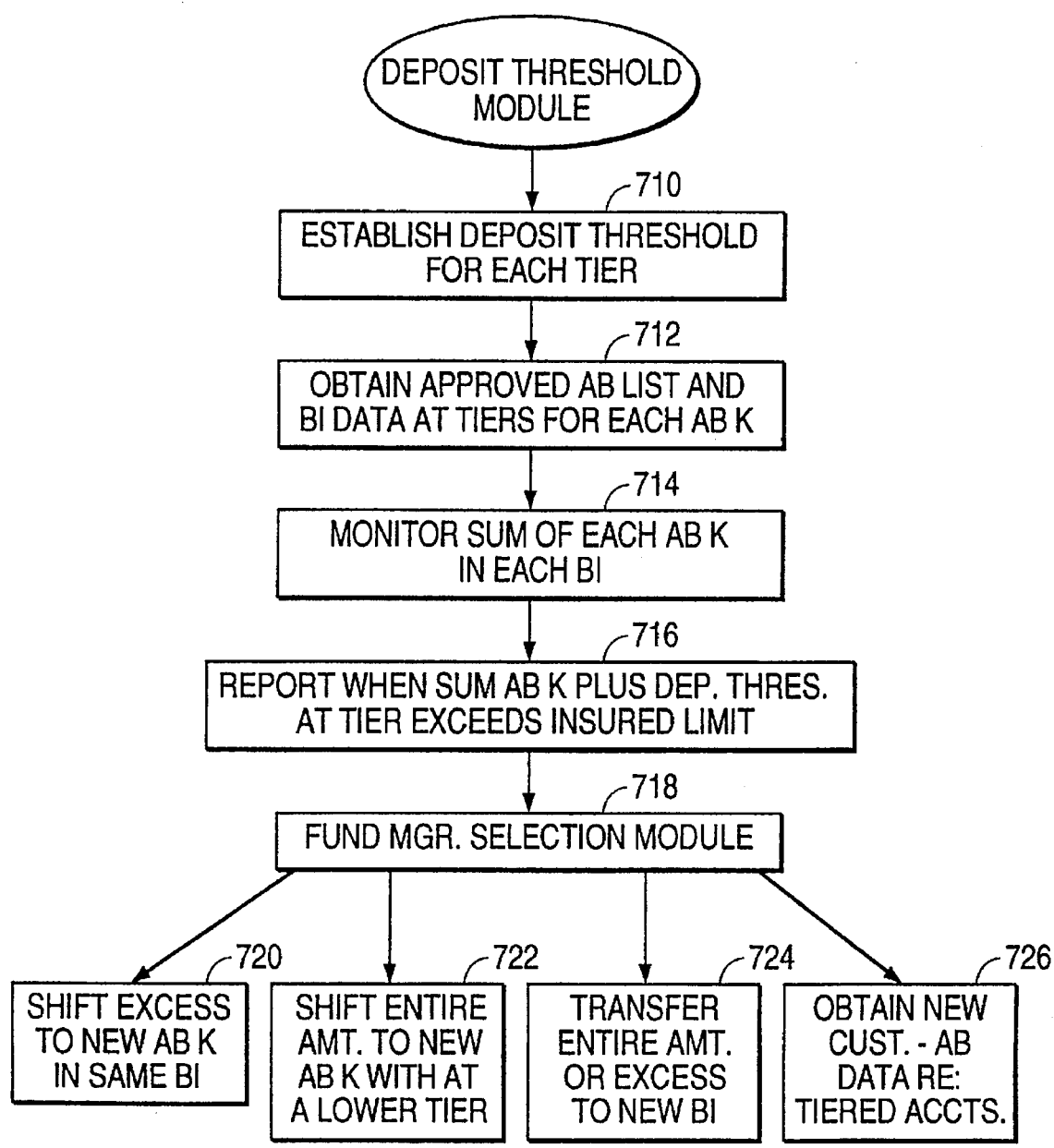
FIG. 5 diagrammatically illustrates a front end or deposit threshold module with tiers.

FIG. 5 diagrammatically illustrates a front end or deposit threshold module utilizing the deposit threshold tiers discussed above. In step 710, the system establishes a deposit threshold for each tier. This threshold may be different for particular banks, particular families of banks (within the same or related company) or otherwise. Step 712 obtains data relative to the approved subset of annuity beneficiaries (see the annuity beneficiary list) as well as banking institution data and tier data for each annuity beneficiary. Step 714 monitors the value of each annuity beneficiary contract (K) in each bank (BI). Step 716 provides reports when the sum of a particular annuity beneficiary contract (AB K) plus the deposit threshold identified with a particular bank (the tier) exceeds the insured limit. Step 718 is a fund manager selection module which is preset by the fund manager dependent on certain parameters established for data transactional system herein. The fund manager may determine to shift all excess monies to a new annuity beneficiary contract in the same banking institution which is represented by step 120. Alternatively, in addition to, or as a subset thereof, the manager or system may shift the entire amount of the excessive annuity beneficiary account to another annuity beneficiary from the approved list wherein that other annuity beneficiary has identified that particular banking institution at a lower tier. This is noted in step 722. For example, for a single bank system, assume that the first annuity beneficiary $AB_1$ is the customer individually. Assume also that the individual customer selected a particular bank at the $15,000 level tier. The customer also approved a second annuity beneficiary $AB_2$ as the customer and his or her spouse, jointly. However, for the same bank, $AB_2$ identifies that bank at a tier less than $10,000. When the first annuity beneficiary contract, the $AB_1$-K exceeds the $80,000 (assuming $100,000 deposit insurance), the fund manager may determine that it is more prudent to shift the entire $80,000 annuity fund into the $AB_2$ account thereby providing an additional $10,000 to be accumulated in that particular bank under an $AB_2$ account. Since the customer has already pre-approved the entire list of annuity beneficiaries, it should not matter to him or her where the money is held as long as all the funds are federally insured under the depositor's insurance.

Other selections available to the fund manager which would be executed automatically by the program, depending upon which module is designated as primary, secondary or otherwise, are found in step 724 which transfers the entire amount of the annuity contract or just the excess amount (over the insured limit or the pre-determined fund limit) to a new banking institution. Step 726 provides that the system would automatically generate a report to the customer/ annuity beneficiary requesting an update for the tier level for a particular banking institution or group of banking institutions. In other words, the system can be automated such that it requests additional information from the customer/annuity beneficiary when a particular annuity fund exceeds a certain value. In other words, the periodic monitoring system can request information when the annuity fund level exceeds a certain value rather than on a purely periodic basis, i.e., quarterly.

Figure 6:
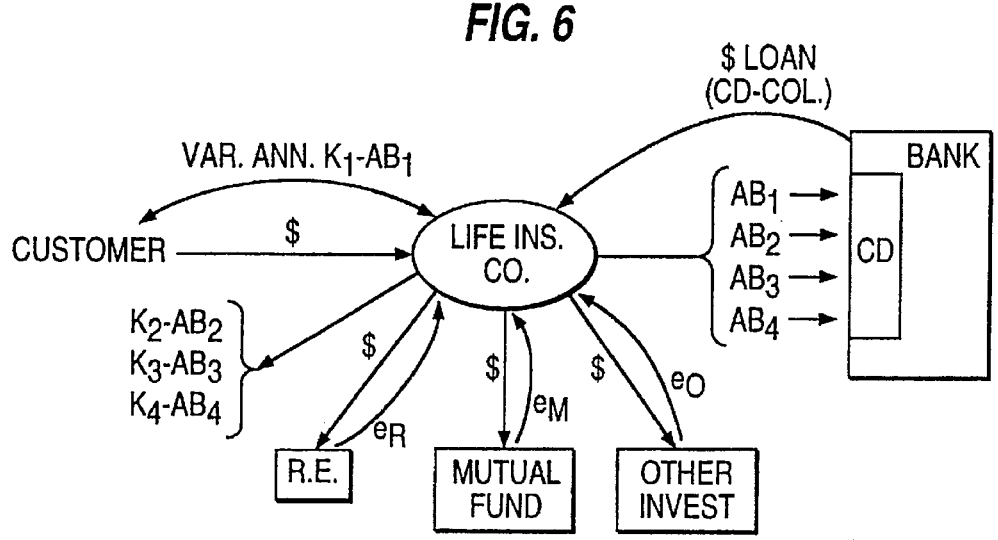
FIGS. 6, 7A and 7B diagrammatically illustrate fund and data flow charts.
Figure 7A:
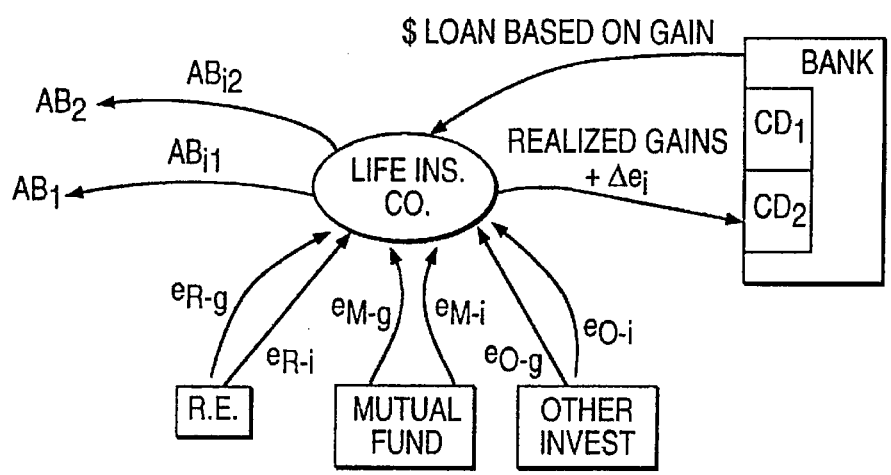
Figure 7B:
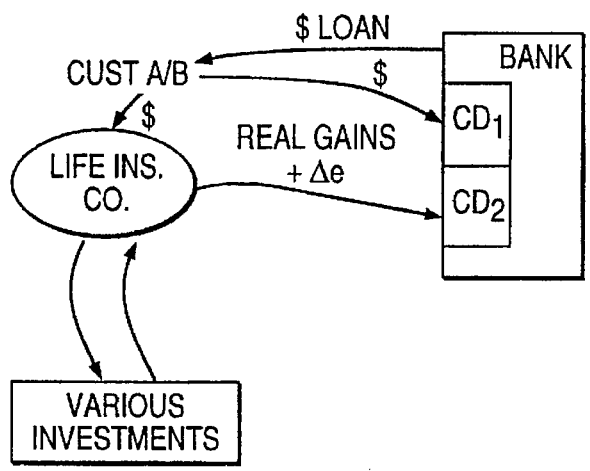

FIGS. 6, 7A and 7B diagrammatically illustrate the flow of funds as well as the flow of data or information relative to the funds. Since a number of abbreviations are used in these figures, the following abbreviations table may be helpful.

| Abbreviations Table for FIGS. 6 and 7 | |
|---|---|
| AB | Annuity beneficiary |
| K | Contract |
| $e_r$, $e_m$, $e_o$ | earnings from real estate (R.E.), mutual funds (m) and other investments (o), respectively |
| $AB_i$ | income to an AB |
| $e_{r-g}$, $e_{r-i}$ | earnings from realized gains in real estate (r-g) and income earnings from real estate (r-l) |
| $e_{m-g}$, $e_{m-i}$ | earnings from realized gains in mutual funds (m-g) and income from mutual funds (n-i) |
| $e_{o-g}$, $e_{o-i}$ | earnings from realized gains in other investments |

-continued

Abbreviations Table for FIGS. 6 and 7

| | |
|---|---|
| $\Delta e_i$ | (o-g) and income from other investments (o-i) the difference between earnings from all investments (real estate, mutual funds, others) and the income $AB_i$ paid to $AB_n$. |

With respect to FIG. 6, the customer places money with a life insurance company and the life insurance company establishes an internal account for the customer. The life insurance company then accumulates various funds from individual accounts as $AB_1$, $AB_2$, $AB_3$ and $AB_4$ and purchases a certificate of deposit or deposit instrument (collectively herein a "CD") from the bank. In return for the customer establishing these annuity contracts with the life insurance company, the life company may give the customer a variable annuity contract $K_1$–$AB_1$. The insurance company may obtain a loan from the bank based upon the CD and may invest this money into real estate, mutual funds or other investments (debt, equity and etc.). These investments involve the transfer of money to the seller of the investment and these secondary investments generate certain earnings "e". These earnings are generally identified as monthly earnings such as interest, dividends or rents. The investments are secondary because the "primary" investment is held by the bank.

Alternatively, the customer-AB could directly deposit the money in the bank and obtain a loan (collateralized by the CD). The loan proceeds would then be given to the life insurance company for the secondary investments (real estate, mutual funds, etc.). The customer-AB, the bank and the life insurance company may sign an agreement whereby the bank looks to the secondary investment as substitute collateral for the loan. If the value of the secondary investment-substitute collateral is not sufficient to cover the loan, the bank would prohibit a full withdrawal of funds from the secondary investments by customer-AB. If the secondary investments fully cover the loan, upon full withdrawal from the system by the customer, the bank and the life insurance company close out the loan, liquidate the CD (the primary investment) and the secondary investment and pay the customer-AB the difference between the total and the loan pay-off amount.

FIG. 7A shows a more complex system where the life insurance company receives not only earned income earnings from the various investments such as income earnings $e_{r-i}$ from real estate and $e_{m-i}$ income earnings from mutual funds and from other investments but also realized gains from cashing out of secondary investments. The realized gains from real estate occur when the real estate is sold and when the value or the amount of the sale exceeds the basis or cost of the investment. This results in a realized gain. These realized gains from the sales of investments are shown in FIG. 7A. $E_{r-g}$ represents earnings as realized gains from real estate. $E_{m-g}$ represents the realized gains from the sale of mutual fund shares etc. These realized gains are sent from the insurance company back to the bank for another CD ($CD_2$). Also, the difference between the monthly income earnings (dividends, rents and interest) less the monthly payouts to each annuity beneficiary ($AB_{i1}$, $AB_{i2}$) are re-invested in the bank. The realized gains and earnings differential are invested into $CD_2$. This enables the annuity beneficiaries to obtain the benefit of depositor's insurance on realized gains and earnings which are accumulated in the bank. These realized gains and earnings are part of the annuity fund data monitored in step 26 in FIG. 1A, the monitor sum step 714 in FIG. 5, the sum account balances step 414 in FIG. 4, and the qualified fund data acquisition in FIGS. 3B, 3C and 3D. The realization, conversion and investment in an approved banking institution provides depositor's insurance for those realized gains and earnings for each annuity beneficiary contract.

FIG. 7B diagrammatically illustrates another data flow and transactional system. The system shown in FIG. 7B, the customer/annuity beneficiary places his or her initial investment in a certificate of deposit or depository instrument $CD_1$ in a bank. The bank then loans the money back to the customer/annuity beneficiary. This enables the annuity beneficiary to obtain the benefit of depositor's insurance on $CD_1$. The loan money from the customer/annuity beneficiary is given to the life insurance company which invest in various secondary investments as discussed above. For example, the life insurance company may invest in mutual funds, real estate, debt, equity and etc. The returns or earnings from those various secondary investments are channeled through the life insurance company and ultimately placed in $CD_2$ whereby the realized earnings and gains are subject to the depositor's insurance. The insurance company may also make monthly payments to the annuity beneficiaries designated in the corresponding contracts. In such cases, the differential between the realized gains and earnings and the monthly payments are deposited in deposit instrument $CD_2$ at the bank. The insurance company, the bank and the customer-AB may have an agreed upon arrangement such that the customer-AB may use his or her designated portion of $CD_2$ as collateral for another loan. The proceeds of this loan would be channeled through the insurance company and ultimately into further secondary investments. This deposit-loan-reinvestment plan may be "seamless" to the customer-AB in that the bank and the insurance company may have a master agreement relating to the initial direct deposit of the funds into the bank by the customer-AB, the initial loan and the subsequent transfer, conversion and loan on realized gains and earnings.

With respect to redemptions of the contracts by customer/$AB_s$, it may be possible to first liquidate the secondary investments to pay off the bank loan thereby minimizing the degree of insurance on the primary investment. In this case, the secondary investment may be substitute collateral for the loan.

FIG. 7B would require transactional data monitoring and processing since the life insurance company must track the amount and principal accumulation of $CD_1$ in the bank. In other words, the customer/annuity beneficiary must give permission to the life insurance to acquire data, preferably electronically from the bank regarding the amount of $CD_1$. The life insurance company would also monitor the amount or $CD_2$ which represents the realized gains and earnings differential. The company would also monitor non-annuity and unqualified annuity funds in some manner as described above. The life insurance company would periodically issue reports to the customer/annuity beneficiary regarding the value of his or her annuity funds.

For any particular annuity contract, the customer/annuity beneficiary may wish to diversify his or her portfolio. In other words, the customer/annuity beneficiary may wish to have part of his or her annuity contract protected by depositor's insurance and have other parts not so protected. Further, the system described above with respect to the loans using the initial annuity contract as collateral results an annuity contract whereby although the principal amount is subject to depositor's insurance, the annuity beneficiary is subject to market forces in that the loan proceeds in the secondary investments could be rendered worthless (or more optimistically generate a significantly higher return on investment than the return on a CD or deposit investment). Although the principal of the annuity contract may be fully protected by the depositor's insurance, other parties of the annuity contract may be subject to market forces. For example, assume that the annuity beneficiary obtained a loan from the bank using the CD investment of the annuity contract as collateral. Assume further that the annuity beneficiary invested the loan proceeds in mutual funds. The value of the annuity contract would depend upon the market value or net asset value (NAV) of the mutual funds. If the mutual funds increase in value, the total value of the annuity contract would also increase. Similarly, if the value of the mutual funds fell, the value of the total annuity contract would fall. The annuity beneficiary is protected against (a) failure of the bank since the government would pay the value of the CD in the event of such failure and (b) the failure of the life insurance company since the CD is, on a legal basis, owned by the annuity beneficiary. In other words, the life insurance company does not have any right to retain the value of that deposited money. However, the customer-AB's investment in the mutual funds is subject to market forces.

In the event the annuity beneficiary, wanted to diversify or shift part of his or her annuity contract into a higher risk category (thereby enhancing the potential for higher gains), the following customer report may be useful.

---

Customer Report

Customer data

Annuity 1 type: Variable
risk level = w %
beneficiary: $AB_1$ (customer individually)
monthly income $i_1$ = $Q1, $Q2, $Q3, $Q4
Initial Investment = $$P_i$
Current value V. Ann. 1 = $$V_1$
Rate of return V. Ann. 1 = $r_1$
Absolutely insured amount (AIA) $ _____
Potentially insured amount (PIA) $ _____
Note: Insurance protects against the failure of the bank holding the CD-principal or the Life Insurance Company.
Affected Banks: $BI_1$
Beneficiary Banks: $BI_1$, $BI_2$
Identify tiers for banks: _____

Annuity 2 type: Variable
beneficiary: $AB_2$ (customer and spouse jointly)
    repeat data above with $i_2$, $$P_2$, $$V_2$, $r_2$, AIA and PIA, etc.

Annuity 3 type: fixed
beneficiary: $AB_3$ (customer and child A jointly)
monthly income $i_3$ fixed at $Qf
initial investment = $ $P_3$
AIA = $ $P_3$ if $i_3$ equals CD earnings
[Optionally: list AIA and PIA if $i_3$ is greater than return on CD]

---

In the customer report, each annuity has an assigned risk level selected initially by the customer-AB. If the risk level "w" is 100%, all of the annuity fund is subject to market forces. In annuity 1, the beneficiary is $AB_1$ which is the customer individually. The customer receives monthly income $i_1$ on a quarterly basis equal to $Q1, $Q2, $Q3 and $Q4. The initial investment was $$P_1$. The current value of the variable annuity is $$V_1$. The current value $V_c$ may be calculated as shown in equation A which follows.

---

Eq. A $V_c$ = (P (1 - % risk) plus interest on CD earnings therefrom)
plus
(P (% risk) plus (value non-CD investments less P (% risk)))
plus
(realized earnings from non-CD investments)

---

In equation A, the total current value of $V_c$ may be computed as follows: The initial principal P is multiplied by the difference 1 minus the percentage risk value w. If the customer accepts 100% market risk, the difference is zero (1—1) and therefore this portion of the $V_c$ formula is zero. On the other hand, if the risk value w if zero, the total principal P is protected. The earnings from that protected or risk free investment is added to the fully insured principal.

The next portion of the $V_c$ formula quantifies the value of the annuity contract which is subject to market forces. The principal multiplied by the risk factor represents the initial investment which is subject to the market risk w. This value is added to the net, unrealized gain of the non-CD investments. In other words, the net unrealized gain is the value of the non-CD investments or secondary investments less the initial market risk investment. This portion of the $V_c$ formula is added to realized earnings whether realized gains or realized incomes from non-CD or secondary investments.

The customer report then shows the rate of return for the variable annuity one which is $r_1$. The customer report may also provide an indication regarding the amount of absolutely insured investments "AIA." Equation B which follows shows the value of AIA.

---

Eq. B absolutely insured amount=(P (1-% risk) plus interest on CD earnings therefrom)

---

In equation B, the absolutely insured amount is the non-risk principal P multiplied by 1 minus %risk plus the earnings from that non-risk investment.

The customer report may also indicate the potentially insured amount or "PIA." Equation C which follows shows the potentially insured amount.

---

Eq. C

Potentially insured amount = (AIA)
plus
P (% risk) plus (value non-CD investments less P (% risk))
plus
(realized and converted earnings from non-CD investments)

---

The potentially insured amount PIA is the absolutely insured amount AIA plus the initial investment at market risk plus the unrealized gain from the non-CD investment plus the realized and converted earnings (realized gains and monthly or periodic income earnings) from the non-CD investments. The potentially insured amount is the amount insured if the bank and/or the life insurance company fails.

The customer report may also provide a note that the insurance protects only certain aspects of the annuity beneficiaries contract. Also, the customer report may identify affected banks and banks currently utilized by the beneficiary. The affected banks are banks holding qualified annuity funds for the system. Beneficiary banks are banks holding non-annuity and unqualified annuity funds for benefit of the annuity beneficiary. Tier identification for each AB bank may also be included in the report. The customer report would also preferably show other annuity contracts such as annuity 2 and annuity 3 as set forth above.

Figure 8:
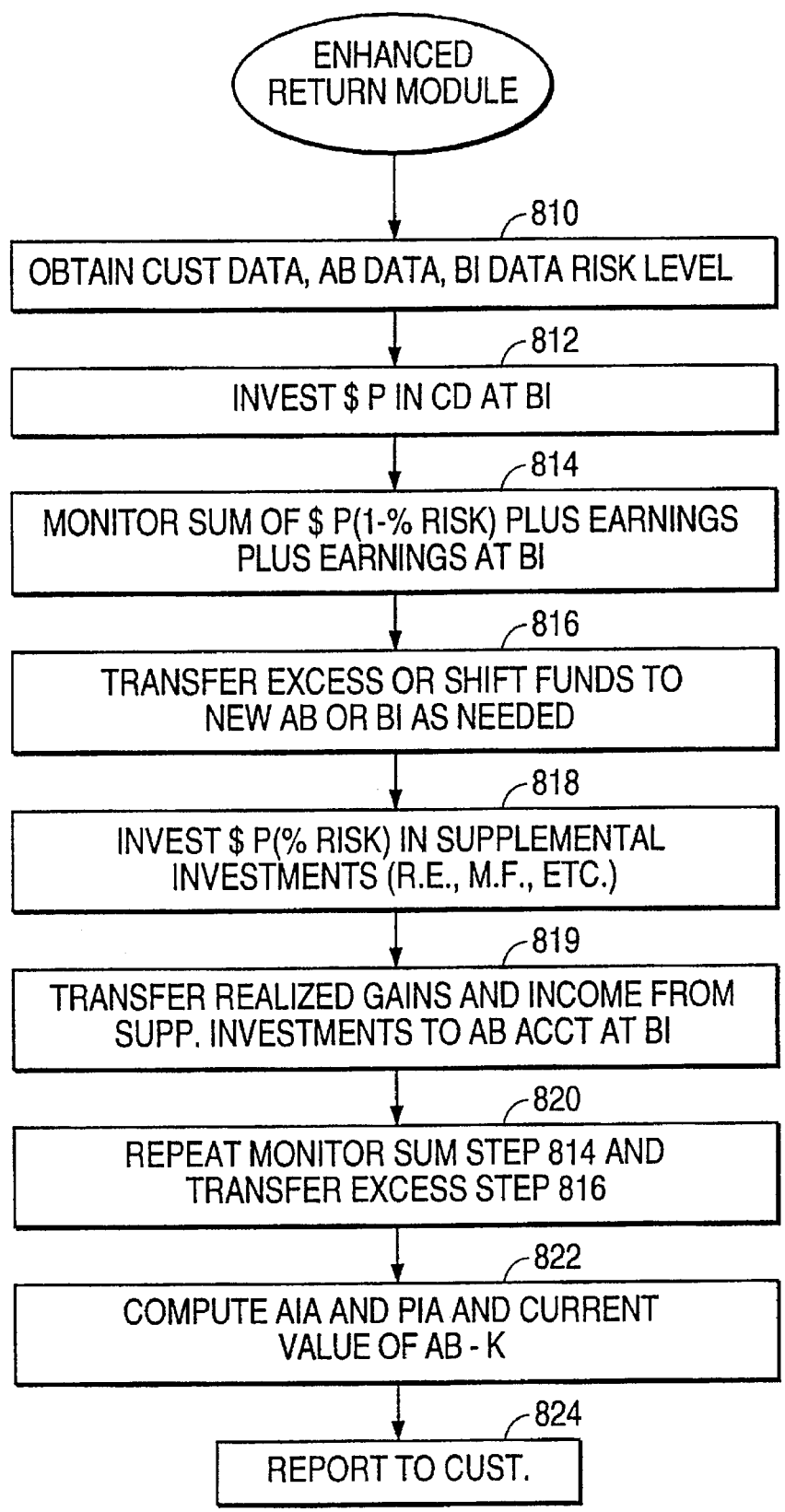
FIG. 8 diagrammatically illustrates a diversified or enhanced return system module.

FIG. 8 diagrammatically illustrates a diversified or an enhanced return system module. In step 810, the system obtains customer data, annuity beneficiary data, banking institution data and the risk level data acceptable to the customer/annuity beneficiary for the particular annuity contract. In step 812, the system invests the principle $P in a CD in a bank. In step 814, the system monitors the sum of the non-risk principal P(1-%risk) plus the earnings (interest) at the particular bank. In step 816, the system transfers excess amounts of the qualified annuity funds over the pro-determined fund threshold into a new annuity beneficiary account or into a new banking institution as is necessary or as described earlier. Step 818 invests the risk money $P (%risk) in supplemental or secondary investment such as real estate, mutual funds etc. In steps 818 and 819, the system transfers realized gains and income from the supplemental investment to the annuity beneficiary account at the particular bank institution. Step 820 repeats "monitor" step 814 and "transfer excess step" 816. Step 822 computes the absolutely insured amount AIA and the potentially insured amount PIA and the current value $V_c$ of the annuity beneficiary contract AB-K. Step 824 provides a report to the customer which may include the data from the customer report set forth above.

It may be desirable to establish a system utilizing a pool of annuity contracts. Further, a pooled system may be so complex or that, so large at any given moment, the system operator could not absolutely guarantee that all funds associated with the system are covered by depositor's insurance. In order to ascertain and track the uninsured portions, the following exposure tables, Exposure Tables 1 and 2, establish exemplary system parameters. These parameters may be incorporated into a data transactional system to monitor the deposit insurance coverage for a multiplicity of annuity or life insurance contracts.

| Exposure Table 1 |
| --- |
| Pool limit is 100 ABs per BI |
|     $50K ($50,000) initial investment (fixed) per contract |
|         1K dep thres: AB limit none         Tier 1 |
|         5K dep thres: AB limit is 20 ABs     Tier 2 |
|         10K dep thres. AB limit is 10 ABs    Tier 3 |
|     LD-CD or BIC equals $5M ($5,000,000) |
|         government insured value = $100K |
|         pred. fund limit = $95K |
|         reserved funds calculation (maximum) |
|             1st determine covered funds |
|                 1K AB dep thres |
|                 5K AB dep thres |
|                     Tier 1 and 2 ABs are fully covered |
|             2nd determine exposure for uncovered funds |
|                 10K less (100K less pred. fund limit) |
|                 exposure 5K per uncovered AB |
|                 total exposure 5K multiplied by number of uncovered ABS - ($5K times 10 max'm ABs) = $50K |
|                 total expose |
|     Secure insurance for $50K if bank failure or reserve funds |

| Exposure Table 2 |
| --- |
| Pool limit is 100 ABs per BI |
|     $50K–$90K initial investment per contract |
|         10K dep thres: AB limit none         Tier 1 |
|         10K–15K dep thres: AB limit 20      Tier 2 |
|         15K–20K dep thres: AB limit 10      Tier 3 |
| BIC equals $5M to $9M |
|     government insured value is $100K |
|     pred. fund limit = $90K |
|     reserved funds calculation: |
|         minimum |
|             Tier 1 ABs are fully covered by insurance |
|     maximum exposure |
|         2nd Tier: $5K exposure per AB at Tier 2 |
|             20 ABs maximum at Tier 2 |
|             $5K multiplied by 20 = $1M exposure |
|         3rd Tier: $20K exposure per AB at Tier 3 |
|             10 ABs maximum at Tier 3 |
|             $20K times 10 = $200K exposure |
|         total maximum exposure is $1.2M |

In each one of these exposure tables, the total number of annuity beneficiaries is limited to a certain pool limit. In Exposure Table 1, the initially investment is fixed at $50,000 per annuity contract. Only 100 annuity beneficiaries may participate in this bank pool. On the other hand, deposit thresholds have been established and the number annuity beneficiaries are limited at tiers 2 and 3. The calculations set forth in Exposure Table 1 provide that the maximum degree of exposure for uninsured funds is $50,000 or $50K. With respect to Exposure Table 2, the pool limit is 100 annuity beneficiaries but the initial investment for each AB contract may vary from $50,000 to $90,000. The maximum uninsured exposure is $1,200,000 ($1.2M) as calculated in Exposure Table 2. The exposure level at each tier is established by subtracting, from the deposit threshold, the depositor's insurance limit less the pre-determined fund limit. The pre-determined fund limit is explained earlier. If the deposit threshold is less than or equal to the pre-determined fund limit, there is no exposure. However, for a deposit threshold greater than the predetermined fund limit, the exposure for the system is based upon the number of annuity, beneficiaries at that tier multiplied by the amount of exposed investment for each annuity beneficiary,. When these tiered values and exposure levels are summed, the maximum exposure can be calculated for the system.

As explained earlier, the system can operate substantially similar with life insurance contracts and life insurance beneficiaries. The claims appended hereto are meant to cover a system operating in conjunction with life insurance funds.

What is claimed is:

1. A computer-based method for electronically processing transactional data and monitoring funds for a plurality of annuity or life insurance contracts, purchased by a plurality of customers funding said contracts, to obtain the benefit of depositor's insurance available through at least one of a plurality of federally approved banking institutions, said depositor's insurance protecting funds less than a predetermined fund limit, said computer-based method comprising the steps of:

electronically inputting and storing annuity or life insurance contract fund data, associated customer data, contract beneficiary data;

electronically inputting and storing non-annuity contract, unqualified annuity contract and non-life insurance contract fund data representing non-contract funds, above a predetermined threshold held in banking institutions for each beneficiary;

electronically determining whether the sum of all contract funds, identified with a single beneficiary and designated for one banking institution of said plurality of banking institutions, plus all non-contract funds held by said one banking institution for said single beneficiary and represented by corresponding data, exceeds said predetermined fund limit;

electronically commanding and ordering the transfer of excess contract funds identified with said single beneficiary and designated for said one banking institution to another one of said plurality of banking institutions; and, electronically determining the excess contract funds, inputting and storing non-contract fund and related banking institution data, and electronically commanding and ordering the transfer of excess contract funds, for all banking institutions designated to hold contract funds for all beneficiaries to obtain the benefit of said depositor's insurance for contract funds.

2. A computer-based method for electronically processing transactional data as claimed in claim 1 wherein the step of electronically inputting and storing non-contract fund data above said predetermined threshold includes the step of providing a predetermined fund threshold which is greater than or equal to zero and the method includes the step of electronically substituting said predetermined threshold for said non-contract fund data in the step of electronically determining the sum when said non-contract fund data does not exceed said predetermined threshold.

3. A computer-based method for electronically processing transactional data as claimed in claim 1 wherein the steps of inputting and storing non-contract fund data and related banking institution data, electronically determining excess contract funds, and electronically commanding and ordering the transfer of excess contract funds includes the step of electronically utilizing data from a single banking institution.

4. A computer-based method for electronically processing transactional data as claimed in claim 1 including the steps of:

electronically inputting data regarding government established depositor's insurance limit value;

establishing said predetermined fund limit as one of said depositor's insurance limit value or a predetermined lower value.

5. A computer-based method for electronically processing transactional data as claimed in claim 1 including the steps of:

generating a periodic printed out report showing the sum of all contract funds for a respective beneficiary provided by a corresponding customer and which obtain the benefit of said depositor's insurance for said contract funds; and, generating a supplemental printed out report showing all banking institution data for each said respective beneficiary.

6. A computer-based method for electronically processing transactional data as claimed in claim 2 wherein the steps of inputting and storing non-contract fund data and related banking institution data, electronically determining excess contract funds, and electronically commanding and ordering the transfer of excess contract funds includes the step of electronically utilizing data from a single banking institution.

7. A computer-based method for electronically processing transactional data as claimed in claim 6 including the steps of:

electronically inputting data regarding government established depositor's insurance limit value;

establishing said predetermined fund limit as one of said depositor's insurance limit value or a predetermined lower value.

8. A computer-based method for electronically processing transactional data as claimed in claim 7 including the steps of:

generating a periodic printed out report showing the sum of all contract funds for a respective beneficiary provided by a corresponding customer and which obtain the benefit of said depositor's insurance for said contract funds; and, generating a supplemental printed out report showing all banking institution data for each said respective beneficiary.

9. A computer-based method for electronically processing transactional data and monitoring funds for a plurality of annuities, purchased by a plurality of customers funding said annuities, to obtain the benefit of depositor's insurance available through at least one of a plurality of federally approved banking institutions, said depositor's insurance protecting funds less than a predetermined fund limit, said computer-based method comprising the steps of:

electronically inputting and storing annuity fund data, associated customer data, annuity beneficiary data that includes, for at least one annuity fund, a subset of annuity beneficiary data approved for said one annuity fund, and banking institution data;

electronically inputting and storing non-annuity funds and unqualified annuity funds data above a predetermined threshold held in banking institutions for each annuity beneficiary;

electronically determining whether the sum of all annuity funds, identified with a single annuity beneficiary and designated for certificates of deposit issued by one banking institution of said plurality of banking institutions, plus all non-annuity funds and unqualified annuity funds held by said one banking institution for said single annuity beneficiary and represented by corresponding data, exceeds said predetermined fund limit;

for said single annuity beneficiary which is not included in said approved subset, electronically commanding and ordering the transfer of excess annuity funds identified with said single annuity beneficiary and designated for said one banking institution to a first deposit instrument issued by another one of said plurality of banking institutions;

for said single annuity beneficiary which is included in said approved subset, electronically commanding and ordering the transfer of excess annuity funds identified with said single annuity beneficiary and designated for said one banking institution to a second deposit instrument identified with another annuity beneficiary that is part of the approved subset with said single annuity beneficiary and issued by said one banking institution of said plurality of banking institutions; and, electronically determining the excess annuity funds, inputting and storing non-annuity funds and unqualified annuity funds and related banking institution data, and electronically commanding and ordering the transfer of excess annuity funds, for all banking institutions designated to hold certificates of deposit for all annuity beneficiaries to obtain the benefit of said depositor's insurance for qualified annuity funds.

10. A computer-based method for electronically processing transactional data as claimed in claim 9 wherein the step of electronically inputting and storing non-annuity funds and unqualified annuity funds data above said predetermined threshold includes the step of providing a predetermined fund threshold which is greater than or equal to zero and the method includes the step of electronically substituting said predetermined threshold for said non-annuity and unqualified annuity fund data in the step of electronically determining the sum when said fund data does not exceed said predetermined threshold.

11. A computer-based method for electronically processing transactional data as claimed in claim 9 wherein the steps of inputting and storing non-annuity funds and unqualified annuity funds and related banking institution data, electronically determining excess annuity, funds, and electronically commanding and ordering the transfer of excess annuity funds includes the step of electronically utilizing data from a single banking institution.

12. A computer-based method for electronically processing transactional data as claimed in claim 9 including the steps of:

electronically inputting data regarding government established depositor's insurance limit value;

establishing said predetermined fund limit as one of said depositor's insurance limit value or a predetermined lower value.

13. A computer-based method for electronically processing transactional data as claimed in claim 9 including the steps of:

generating a periodic printed out report showing the sum of all annuity funds for a respective annuity beneficiary provided by a corresponding customer and which obtain the benefit of said depositor's insurance for said qualified annuity funds; and, generating a supplemental printed out report showing all banking institution data for each said respective annuity beneficiary.

14. A computer-based method for electronically processing transactional data as claimed in claim 10 wherein the steps of inputting and storing non-annuity funds and unqualified annuity funds and related banking institution data, electronically determining excess annuity funds, and electronically commanding and ordering the transfer of excess annuity funds includes the step of electronically utilizing data from a single banking institution.

15. A computer-based method for electronically processing transactional data as claimed in claim 14 including the steps of:

electronically inputting data regarding government established depositor's insurance limit value;

establishing said predetermined fund limit as one of said depositor's insurance limit value or a predetermined lower value.

16. A computer-based method for electronically processing transactional data as claimed in claim 15 including the steps of:

generating a periodic printed out report showing the sum of all annuity funds for a respective annuity beneficiary provided by a corresponding customer and which obtain the benefit of said depositor's insurance for said qualified annuity funds; and, generating a supplemental printed out report showing all banking institution data for each said respective annuity beneficiary.

17. A computer-based method for electronically processing transactional data and monitoring funds for a plurality of annuities, purchased by a plurality of customers funding said annuities, to obtain the benefit of depositor's insurance available through at least one of a plurality of federally approved banking institutions, said depositor's insurance protecting funds less than a predetermined fund limit, said computer-based method comprising the steps of:

electronically inputting and storing invested funds data, annuity fund data which is a subset of said invested funds data, associated customer data, annuity beneficiary data, and banking institution data;

electronically inputting and storing non-annuity funds and unqualified annuity funds data above a predetermined threshold held in banking institutions for each annuity beneficiary;

electronically inputting and storing invested funds data for each annuity beneficiary;

electronically determining whether the sum of all annuity funds, identified with a single annuity beneficiary and designated for certificates of deposit issued by one banking institution of said plurality of banking institutions exceeds said predetermined fund limit while accounting for said predetermined threshold and respective non-annuity funds and unqualified annuity funds held by said one banking institution for said single annuity beneficiary;

electronically commanding and ordering the transfer of all excess annuity funds identified with said single annuity beneficiary and designated for said one banking institution to a deposit instrument issued by another one of said plurality of banking institutions;

electronically determining the excess annuity funds plus non-annuity and unqualified annuity funds over said predetermined fund limit, inputting and storing non-annuity funds and unqualified annuity funds and related banking institution data, and electronically commanding and ordering the transfer of excess annuity funds, for all banking institutions designated to hold certificates of deposit for all annuity beneficiaries to obtain the benefit of said depositor's insurance for qualified annuity funds; and, electronically computing and monitoring a total value representing the sum of said annuity funds and said invested funds for each said annuity beneficiary.

18. A computer-based method for electronically processing transactional data as claimed in claim 17 including the step of:

electronically commanding and ordering the transfer of realized earnings from said invested funds into said annuity funds for each respective annuity beneficiary; and, repeating the step of electronically determining the sum of all annuity funds and transferring the excess thereof.

19. A computer-based method for electronically processing transactional data and monitoring funds for a plurality of annuities, purchased by a plurality of customers funding said annuities, to obtain the benefit of depositor's insurance available through at least one of a plurality of federally approved banking institutions, said depositor's insurance protecting funds less than a predetermined fund limit, said computer-based method comprising the steps of:

providing a computer system for the input, output, correlation and storage of customer data, annuity beneficiary data, annuity fund data, and banking institution data;

via said computer system:

(a) electronically inputting and storing annuity fund data, associated customer data, annuity beneficiary data that includes, for at least one annuity fund, a subset of annuity beneficiary data approved for said one annuity fund, and banking institution data;

(b) electronically inputting and storing non-annuity funds and unqualified annuity funds data above a predetermined threshold held in banking institutions for each annuity beneficiary;

(c) electronically determining whether the sum of all annuity funds, identified with a single annuity beneficiary and designated for certificates of deposit issued by one banking institution of said plurality of banking institutions exceeds said predetermined fund limit while accounting for said non-annuity funds and unqualified annuity funds in step (b);

(d) electronically commanding and ordering the transfer of excess annuity funds identified with said single annuity beneficiary and designated for said one banking institution to one of a first deposit instrument issued by another one of said plurality of banking institutions and a second deposit instrument identified with another annuity beneficiary that is part of the approved subset with said single annuity beneficiary and issued by said one banking institution of said plurality of banking institutions; and, (e) electronically determining the excess annuity funds, inputting and storing non-annuity funds and unqualified annuity funds and related banking institution data, and electronically commanding and ordering the transfer of excess annuity funds, for all banking institutions designated to hold certificates of deposit for all annuity beneficiaries to obtain the benefit of said depositor's insurance for qualified annuity funds.

20. A computer-based method for electronically processing transactional data and monitoring funds for a plurality of annuities, purchased by a plurality of customers funding said annuities, to obtain the benefit of depositor's insurance available through at least one of a plurality of federally approved banking institutions, said depositor's insurance protecting funds less than a predetermined fund limit, said computer-based method comprising the steps of:

providing a computer system for the input, output, correlation and storage of customer data, annuity beneficiary data, annuity fund data, and banking institution data;

via said computer system:

(a) electronically inputting and storing annuity fund data, associated customer data, annuity beneficiary data that includes, for at least one annuity fund, a subset of annuity beneficiary data approved for said one annuity fund, and banking institution data;

(b) electronically inputting and storing non-annuity funds and unqualified annuity funds data above a predetermined threshold held in banking institutions for each annuity beneficiary;

(c) electronically determining whether the sum of all annuity funds, identified with a single annuity beneficiary and designated for certificates of deposit issued by one banking institution of said plurality of banking institutions, plus all non-annuity funds and unqualified annuity funds held by said one banking institution for said single annuity beneficiary and represented by corresponding data, exceeds said predetermined fund limit;

(d) for said single annuity beneficiary which is not included in said approved subset, electronically commanding and ordering the transfer of excess annuity funds identified with said single annuity beneficiary and designated for said one banking institution to a first deposit instrument issued by another one of said plurality of banking institutions;

(e) for said single annuity beneficiary which is included in said approved subset, electronically commanding and ordering the transfer of excess annuity funds identified with said single annuity beneficiary and designated for said one banking institution to a second deposit instrument identified with another annuity beneficiary that is part of the approved subset with said single annuity beneficiary and issued by said one banking institution of said plurality of banking institutions; and, (f) electronically determining the excess annuity funds, inputting and storing non-annuity funds and unqualified annuity funds and related banking institution data, and electronically commanding and ordering the transfer of excess annuity funds, for all banking institutions designated to hold certificates of deposit for all annuity beneficiaries to obtain the benefit of said depositor's insurance for qualified annuity funds.

21. A computer-based method for electronically processing transactional data and monitoring funds for a plurality of annuities, purchased by a plurality of customers funding said annuities, to obtain the benefit of depositor's insurance available through at least one of a plurality of federally approved banking institutions, said depositor's insurance protecting funds less than a predetermined fund limit, said computer-based method comprising the steps of:

providing a computer system for the input, output, correlation and storage of customer data, annuity beneficiary data, annuity fund data, and banking institution data;

via said computer system:

(a) electronically inputting and storing invested funds data, annuity fund data which is a subset of said invested funds data, associated customer data, annuity beneficiary data, and banking institution data;

(b) electronically inputting and storing non-annuity funds and unqualified annuity funds data above a predetermined threshold held in banking institutions for each annuity beneficiary;

(c) electronically inputting and storing invested funds data for each annuity beneficiary;

(d) electronically determining whether the sum of all annuity funds, identified with a single annuity beneficiary, and designated for certificates of deposit issued by one banking institution of said plurality of banking institutions exceeds said predetermined fund limit while accounting for data identified in step (b) for said single annuity beneficiary;

(e) electronically commanding and ordering the transfer of all excess annuity funds identified with said single annuity beneficiary and designated for said one banking institution to a deposit instrument issued by another one of said plurality of banking institutions;

(f) electronically determining the excess annuity funds plus non-annuity and unqualified annuity funds over said predetermined fund limit, inputting and storing non-annuity funds and unqualified annuity funds and related banking institution data, and electronically commanding and ordering the transfer of excess annuity funds, for all banking institutions designated to hold certificates of deposit for all annuity beneficiaries to obtain the benefit of said depositor's insurance for qualified annuity funds; and, (g) electronically computing and monitoring a total value representing the sum of said annuity funds and said invested funds for each said annuity beneficiary.

22. A computer-based system for electronically processing annuity funds to obtain the benefit of depositor's insurance available through a plurality of federally approved banking institutions, said depositor's insurance protecting funds less than a predetermined fund limit, said computer-based system comprising:

means for electronically inputting and storing annuity fund, non-annuity fund and unqualified annuity fund data and associated annuity beneficiary data that includes, for at least one annuity fund, a subset of annuity beneficiary data approved for said one annuity fund, associated customer data, and banking institution data;

means for identifying, electronically labeling and maintaining an electronic list of all banking institutions which hold non-annuity funds and unqualified annuity funds above a predetermined threshold for each annuity beneficiary;

means for electronically determining whether the sum of all annuity funds, identified with a single annuity beneficiary and designated for certificates of deposit issued by one banking institution of said plurality of banking institutions exceeds said predetermined fund limit while taking into account non-annuity funds and unqualified annuity funds above said predetermined threshold;

means for electronically commanding and ordering the transfer of all annuity funds identified with said single annuity beneficiary and designated for said one banking institution in excess of said predetermined fund limit to one of a first deposit instrument issued by another banking institution of said plurality of banking institutions and a second deposit instrument identified with another annuity beneficiary that is part of the approved subset with said single annuity beneficiary and issued by said one banking institution of said plurality of banking institutions; and, means for electronically determining excess funds over said predetermined fund limit, electronically inputting non-annuity fund and unqualified annuity fund data and related banking institution data, and electronically commanding the transfer of excess annuity funds, for all banking institutions designated to hold certificates of deposit for all annuity beneficiaries to obtain the benefit of said depositor's insurance for qualified annuity funds.

23. A computer-based system for electronically processing annuity funds to obtain the benefit of depositor's insurance available through a plurality of federally approved banking institutions, said depositor's insurance protecting funds less than a predetermined fund limit, said computer-based system comprising:

means for electronically inputting and storing invested funds data, annuity fund data which is a subset of said invested funds data, non-annuity fund and unqualified annuity, fund data and associated annuity beneficiary data, associated customer data, and banking institution data;

means for identifying, electronically labeling and maintaining an electronic list of all banking institutions which hold non-annuity funds and unqualified annuity funds above a predetermined threshold for each annuity beneficiary;

means for electronically monitoring invested funds data for each annuity beneficiary;

means for electronically determining whether the sum of all annuity funds, identified with a single annuity beneficiary and designated for certificates of deposit issued by one banking institution of said plurality of banking institutions exceeds said predetermined fund limit while taking into account non-annuity funds and unqualified annuity funds above said predetermined threshold;

means for electronically commanding and ordering the transfer of all annuity funds identified with said single annuity beneficiary and designated for said one banking institution in excess of said predetermined fund limit to a deposit instrument issued by another banking institution of said plurality of banking institutions;

means for electronically determining excess funds over said predetermined fund limit, electronically inputting non-annuity fund and unqualified annuity fund data and related banking institution data, and electronically commanding the transfer of excess annuity funds, for all banking institutions designated to hold certificates of deposit for all annuity beneficiaries to obtain the benefit of said depositor's insurance for qualified annuity funds; and, means for computing and monitoring a total value representing the sum of said annuity funds and said invested funds for each annuity beneficiary.

24. A computer-based system for electronically processing as claimed in claim 23 including:

means for electronically commanding and ordering the transfer of realized earnings from said invested funds into said annuity funds for each respective annuity beneficiary.

25. A computer-based method for electronically processing transactional data and monitoring funds for a plurality of life insurance contracts, purchased by a plurality of customers funding said life insurance contracts, to obtain the benefit of depositor's insurance available through at least one of a plurality of federally approved banking institutions, said depositor's insurance protecting funds less than a predetermined fund limit, said computer-based method comprising the steps of:

electronically inputting and storing life fund data, associated customer data, life beneficiary data that includes, for at least one life fund, a subset of life beneficiary data approved for said one life fund, and banking institution data;

electronically inputting and storing non-life funds and unqualified life funds data above a predetermined threshold held in banking institutions for each life beneficiary;

electronically determining whether the sum of all life funds, identified with a single life beneficiary and designated for certificates of deposit issued by one banking institution of said plurality of banking institutions, plus all non-life funds and unqualified life funds held by said one banking institution for said single life beneficiary and represented by corresponding data, exceeds said predetermined fund limit;

electronically commanding and ordering the transfer of excess life funds identified with said single life beneficiary and designated for said one banking institution to one of a first deposit instrument issued by another one of said plurality of banking institutions and a second deposit instrument identified with another life beneficiary that is part of the approved subset with said single life beneficiary and issued by said one banking institution of said plurality of banking institutions; and, electronically determining the excess life funds, inputting and storing non-life funds and unqualified life funds and related banking institution data, and electronically commanding and ordering the transfer of excess life funds, for all banking institutions designated to hold certificates of deposit for all life beneficiaries to obtain the benefit of said depositor's insurance for qualified life funds.

26. A computer-based method for electronically processing transactional data as claimed in claim 25 wherein the step of electronically inputting and storing non-life funds and unqualified life funds data above said predetermined threshold includes the step of providing a predetermined fund threshold which is greater than or equal to zero and the method includes the step of electronically substituting said predetermined threshold for said non-life and unqualified life fund data in the step of electronically determining the sum when said fund data does not exceed said predetermined threshold.

27. A computer-based method for electronically processing transactional data as claimed in claim 25 wherein the steps of inputting and storing non-life funds and unqualified life funds and related banking institution data, electronically determining excess life funds, and electronically commanding and ordering the transfer of excess life funds includes the step of electronically utilizing data from a single banking institution.

28. A computer-based method for electronically processing transactional data as claimed in claim 25 including the steps of:

electronically inputting data regarding government established depositor's insurance limit value;

establishing said predetermined fund limit as one of said depositor's insurance limit value or a predetermined lower value.

29. A computer-based method for electronically processing transactional data as claimed in claim 25 including the steps of:

generating a periodic printed out report showing the sum of all life funds for a respective life beneficiary provided by a corresponding customer and which obtain the benefit of said depositor's insurance for said qualified life funds; and, generating a supplemental printed out report showing all banking institution data for each said respective life beneficiary.

30. A computer-based method for electronically processing transactional data as claimed in claim 26 wherein the steps of inputting and storing non-life funds and unqualified life funds and related banking institution data, electronically determining excess life funds, and electronically commanding and ordering the transfer of excess life funds includes the step of electronically utilizing data from a single banking institution.

31. A computer-based method for electronically processing transactional data as claimed in claim 30 including the steps of:

electronically inputting data regarding government established depositor's insurance limit value;

establishing said predetermined fund limit as one of said depositor's insurance limit value or a predetermined lower value.

32. A computer-based method for electronically processing transactional data as claimed in claim 31 including the steps of:

generating a periodic printed out report showing the sum of all life funds for a respective life beneficiary provided by a corresponding customer and which obtain the benefit of said depositor's insurance for said qualified life funds; and, generating a supplemental printed out report showing all banking institution data for each said respective life beneficiary.

33. A computer-based method for electronically processing transactional data and monitoring funds for a plurality of life insurance contracts, purchased by a plurality of customers funding said life insurance contracts, to obtain the benefit of depositor's insurance available through at least one of a plurality of federally approved banking institutions, said depositor's insurance protecting funds less than a predetermined fund limit, said computer-based method comprising the steps of:

electronically inputting and storing life fund data, associated customer data, life beneficiary data that includes, for at least one life fund, a subset of life beneficiary data approved for said one life fund, and banking institution data;

electronically inputting and storing non-life funds and unqualified life funds data above a predetermined threshold held in banking institutions for each life beneficiary;

electronically determining whether the sum of all life funds, identified with a single life beneficiary and designated for certificates of deposit issued by one banking institution of said plurality of banking institutions, plus all non-life funds and unqualified life funds held by said one banking institution for said single life beneficiary and represented by corresponding data, exceeds said predetermined fund limit;

for said single life beneficiary which is not included in said approved subset, electronically commanding and ordering the transfer of excess life funds identified with said single life beneficiary and designated for said one banking institution to a first deposit instrument issued by another one of said plurality of banking institutions;

for said single life beneficiary which is included in said approved subset, electronically commanding and ordering the transfer of excess life funds identified with said single life beneficiary and designated for said one banking institution to a second deposit instrument identified with another life beneficiary that is part of the approved subset with said single life beneficiary and issued by said one banking institution of said plurality of banking institutions; and, electronically determining the excess life funds, inputting and storing non-life funds and unqualified life funds and related banking institution data, and electronically commanding and ordering the transfer of excess life funds, for all banking institutions designated to hold certificates of deposit for all life beneficiaries to obtain the benefit of said depositor's insurance for qualified life funds.

34. A computer-based method for electronically processing transactional data as claimed in claim 33 wherein the step of electronically inputting and storing non-life funds and unqualified life funds data above said predetermined threshold includes the step of providing a predetermined fund threshold which is greater than or equal to zero and the method includes the step of electronically substituting said predetermined threshold for said non-life and unqualified life fund data in the step of electronically determining the sum when said fund data does not exceed said predetermined threshold.

35. A computer-based method for electronically processing transactional data as claimed in claim 33 wherein the steps of inputting and storing non-life funds and unqualified life funds and related banking institution data, electronically determining excess life funds, and electronically commanding and ordering the transfer of excess life funds includes the step of electronically utilizing data from a single banking institution.

36. A computer-based method for electronically processing transactional data as claimed in claim 33 including the steps of:

electronically inputting data regarding government established depositor's insurance limit value;

establishing said predetermined fund limit as one of said depositor's insurance limit value or a predetermined lower value.

37. A computer-based method for electronically processing transactional data as claimed in claim 33 including the steps of:

generating a periodic printed out report showing the sum of all life funds for a respective life beneficiary provided by a corresponding customer and which obtain the benefit of said depositor's insurance for said qualified life funds; and, generating a supplemental printed out report showing all banking institution data for each said respective life beneficiary.

38. A computer-based method for electronically processing transactional data as claimed in claim 34 wherein the steps of inputting and storing non-life funds and unqualified life funds and related banking institution data, electronically determining excess life funds, and electronically commanding and ordering the transfer of excess life funds includes the step of electronically utilizing data from a single banking institution.

39. A computer-based method for electronically processing transactional data as claimed in claim 38 including the steps of:

electronically inputting data regarding government established depositor's insurance limit value;

establishing said predetermined fund limit as one of said depositor's insurance limit value or a predetermined lower value.

40. A computer-based method for electronically processing transactional data as claimed in claim 39 including the steps of:

generating a periodic printed out report showing the sum of all life funds for a respective life beneficiary provided by a corresponding customer and which obtain the benefit of said depositor's insurance for said qualified life funds; and, generating a supplemental printed out report showing all banking institution data for each said respective life beneficiary.

41. A computer-based method for electronically processing transactional data and monitoring funds for a plurality of life insurance contracts, purchased by a plurality of customers funding said life insurance contracts, to obtain the benefit of depositor's insurance available through at least one of a plurality of federally approved banking institutions, said depositor's insurance protecting funds less than a predetermined fund limit, said computer-based method comprising the steps of:

electronically inputting and storing invested funds data, life fund data which is a subset of said invested funds data, associated customer data, life beneficiary data, and banking institution data;

electronically inputting and storing non-life funds and unqualified life funds data above a predetermined threshold held in banking institutions for each life beneficiary;

electronically inputting and storing invested funds data for each life beneficiary;

electronically determining whether the sum of all life funds, identified with a single life beneficiary and designated for certificates of deposit issued by one banking institution of said plurality of banking institutions exceeds said predetermined fund limit while accounting for said predetermined threshold and respective non-life funds and unqualified life funds held by said one banking institution for said single life beneficiary;

electronically commanding and ordering the transfer of all excess life funds identified with said single life beneficiary and designated for said one banking institution to a deposit instrument issued by another one of said plurality of banking institutions;

electronically determining the excess life funds plus non-life and unqualified life funds over said predetermined fund limit, inputting and storing non-life funds and unqualified life funds and related banking institution data, and electronically commanding and ordering the transfer of excess life funds, for all banking institutions designated to hold certificates of deposit for all life beneficiaries to obtain the benefit of said depositor's insurance for qualified life funds; and, electronically computing and monitoring a total value representing the sum of said life funds and said invested funds for each said life beneficiary.

42. A computer-based method for electronically processing transactional data as claimed in claim 41 including the step of:

electronically commanding and ordering the transfer of realized earnings from said invested funds into said life funds for each respective life beneficiary; and, repeating the step of electronically determining the sum of all life funds and transferring the excess thereof.

43. A computer-based method for electronically processing transactional data and monitoring funds for a plurality of life insurance contracts, purchased by a plurality of customers funding said life insurance contracts, to obtain the benefit of depositor's insurance available through at least one of a plurality of federally approved banking institutions, said depositor's insurance protecting funds less than a predetermined fund limit, said computer-based method comprising the steps of:

providing a computer system for the input, output, correlation and storage of customer data, life beneficiary data, life fund data, and banking institution data;

via said computer system:

(a) electronically inputting and storing life fund data, associated customer data, life beneficiary data that includes, for at least one life fund, a subset of life beneficiary data approved for said one life fund, and banking institution data;

(b) electronically inputting and storing non-life funds and unqualified life funds data above a predetermined threshold held in banking institutions for each life beneficiary;

(c) electronically determining whether the sum of all life funds, identified with a single life beneficiary and designated for certificates of deposit issued by one banking institution of said plurality of banking institutions exceeds said predetermined fund limit while accounting for said non-life funds and unqualified life funds in step (b);

(d) electronically commanding and ordering the transfer of excess life funds identified with said single life beneficiary and designated for said one banking institution to one of a first deposit instrument issued by another one of said plurality of banking institutions and a second deposit instrument identified with another life beneficiary that is part of the approved subset with said single life beneficiary and issued by said one banking institution of said plurality of banking institutions; and, (e) electronically determining the excess life funds, inputting and storing non-life funds and unqualified life funds and related banking institution data, and electronically commanding and ordering the transfer of excess life funds, for all banking institutions designated to hold certificates of deposit for all life beneficiaries to obtain the benefit of said depositor's insurance for qualified life funds.

44. A computer-based method for electronically processing transactional data and monitoring funds for a plurality of life insurance contracts, purchased by a plurality of customers funding said life insurance contracts, to obtain the benefit of depositor's insurance available through at least one of a plurality of federally approved banking institutions, said depositor's insurance protecting funds less than a predetermined fund limit, said computer-based method comprising the steps of:

providing a computer system for the input, output, correlation and storage of customer data, life beneficiary data, life fund data, and banking institution data;

via said computer system:

(a) electronically inputting and storing life fund data, associated customer data, life beneficiary data that includes, for at least one life fund, a subset of life beneficiary data approved for said one life fund, and banking institution data;

(b) electronically inputting and storing non-life funds and unqualified life funds data above a predetermined threshold held in banking institutions for each life beneficiary;

(c) electronically determining whether the sum of all life funds, identified with a single life beneficiary and designated for certificates of deposit issued by one banking institution of said plurality of banking institutions, plus all non-life funds and unqualified life funds held by said one banking institution for said single life beneficiary and represented by corresponding data, exceeds said predetermined fund limit;

(d) for said single life beneficiary which is not included in said approved subset, electronically commanding and ordering the transfer of excess life funds identified with said single life beneficiary and designated for said one banking institution to a first deposit instrument issued by another one of said plurality of banking institutions;

(e) for said single life beneficiary which is included in said approved subset, electronically commanding and ordering the transfer of excess life funds identified with said single life beneficiary and designated for said one banking institution to a second deposit instrument identified with another life beneficiary that is part of the approved subset with said single life beneficiary and issued by said one banking institution of said plurality of banking institutions; and, (f) electronically determining the excess life funds, inputting and storing non-life funds and unqualified life funds and related banking institution data, and electronically commanding and ordering the transfer of excess life funds, for all banking institutions designated to hold certificates of deposit for all life beneficiaries to obtain the benefit of said depositor's insurance for qualified life funds.

45. A computer-based method for electronically processing transactional data and monitoring funds for a plurality of life insurance contracts, purchased by a plurality of customers funding said life insurance contracts, to obtain the benefit of depositor's insurance available through at least one of a plurality of federally approved banking institutions, said depositor's insurance protecting funds less than a predetermined fund limit, said computer-based method comprising the steps of:

providing a computer system for the input, output, correlation and storage of customer data, life beneficiary data, life fund data, and banking institution data;

via said computer system:

(a) electronically inputting and storing invested funds data, life fund data which is a subset of said invested funds data, associated customer data, life beneficiary data, and banking institution data;

(b) electronically inputting and storing non-life funds and unqualified life funds data above a predetermined threshold held in banking institutions for each life beneficiary;

(c) electronically inputting and storing invested funds data for each life beneficiary;

(d) electronically determining whether the sum of all life funds, identified with a single life beneficiary and designated for certificates of deposit issued by one banking institution of said plurality of banking institutions exceeds said predetermined fund limit while accounting for data identified in step (b) for said single life beneficiary;

(e) electronically commanding and ordering the transfer of all excess life funds identified with said single life beneficiary and designated for said one banking institution to a deposit instrument issued by another one of said plurality of banking institutions;

(f) electronically determining the excess life funds plus non-life and unqualified life funds over said predetermined fund limit, inputting and storing non-life funds and unqualified life funds and related banking institution data, and electronically commanding and ordering the transfer of excess life funds, for all banking institutions designated to hold certificates of deposit for all life beneficiaries to obtain the benefit of said depositor's insurance for qualified life funds; and, (g) electronically computing and monitoring a total value representing the sum of said life funds and said invested funds for each said life beneficiary.

46. A computer-based system for electronically processing life funds to obtain the benefit of depositor's insurance available through a plurality of federally approved banking institutions, said depositor's insurance protecting funds less than a predetermined fund limit, said computer-based system comprising:

means for electronically inputting and storing life fund, non-life fund and unqualified life fund data and associated life beneficiary data that includes, for at least one life fund, a subset of life beneficiary data approved for said one life fund, associated customer data, and banking institution data;

means for identifying, electronically labeling and maintaining an electronic list of all banking institutions which hold non-life funds and unqualified life funds above a predetermined threshold for each life beneficiary;

means for electronically determining whether the sum of all life funds, identified with a single life beneficiary and designated for certificates of deposit issued by one banking institution of said plurality of banking institutions exceeds said predetermined fund limit while taking into account non-life funds and unqualified life funds above said predetermined threshold;

means for electronically commanding and ordering the transfer of all life funds identified with said single life beneficiary and designated for said one banking institution in excess of said predetermined fund limit to one of a first deposit instrument issued by another banking institution of said plurality of banking institutions and a second deposit instrument identified with another life beneficiary that is part of the approved subset with said single life beneficiary and issued by said one banking institution of said plurality of banking institutions; and, means for electronically determining excess funds over said predetermined fund limit, electronically inputting non-life fund and unqualified life fund data and related banking institution data, and electronically commanding the transfer of excess life funds, for all banking institutions designated to hold certificates of deposit for all life beneficiaries to obtain the benefit of said depositor's insurance for qualified life funds.

47. A computer-based system for electronically processing life funds to obtain the benefit of depositor's insurance available through a plurality of federally approved banking institutions, said depositor's insurance protecting funds less than a predetermined fund limit, said computer-based system comprising:

means for electronically inputting and storing invested funds data, life fund data which is a subset of said invested funds data, non-life fund and unqualified life fund data and associated life beneficiary data, associated customer data, and banking institution data;

means for identifying, electronically labeling and maintaining an electronic list of all banking institutions which hold non-life funds and unqualified life funds above a predetermined threshold for each life beneficiary;

means for electronically monitoring invested funds data for each life beneficiary;

means for electronically determining whether the sum of all life funds, identified with a single life beneficiary and designated for certificates of deposit issued by one banking institution of said plurality of banking institutions exceeds said predetermined fund limit while taking into account non-life funds and unqualified life funds above said predetermined threshold;

means for electronically commanding and ordering the transfer of all life funds identified with said single life beneficiary and designated for said one banking institution in excess of said predetermined fund limit to a deposit instrument issued by another banking institution of said plurality of banking institutions;

means for electronically determining excess funds over said predetermined fund limit, electronically inputting non-life fund and unqualified life fund data and related banking institution data, and electronically commanding the transfer of excess life funds, for all banking institutions designated to hold certificates of deposit for all life beneficiaries to obtain the benefit of said depositor's insurance for qualified life funds; and, means for computing and monitoring a total value representing the sum of said life funds and said invested funds for each life beneficiary.

48. A computer-based system for electronically processing as claimed in claim 47 including: means for electronically commanding and ordering the transfer of realized earnings from said invested funds into said life funds for each respective life beneficiary.

* * * * *